Sept. 6, 1960 J. J. CALDWELL, JR 2,952,014
OBJECT DETECTING AND LOCATING SYSTEM
Filed May 19, 1942 9 Sheets-Sheet 1
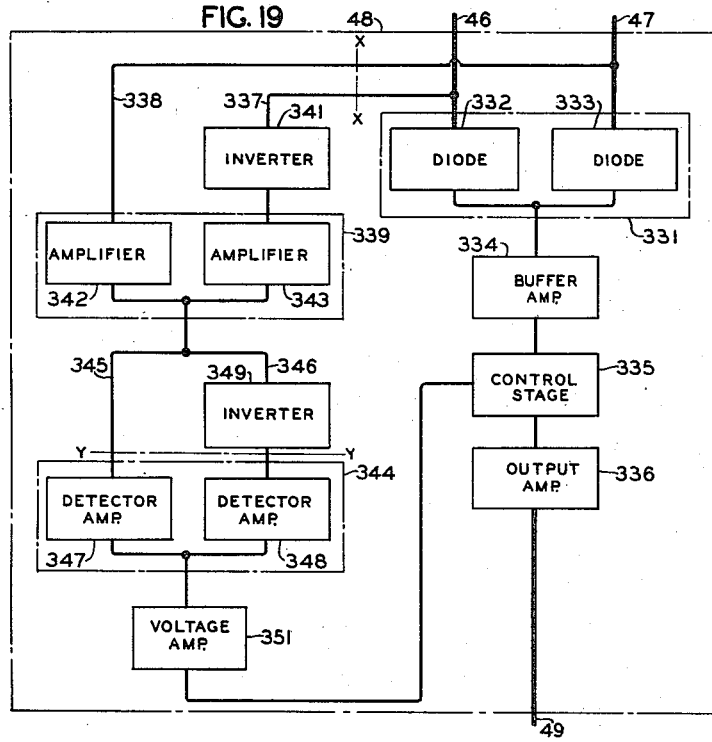
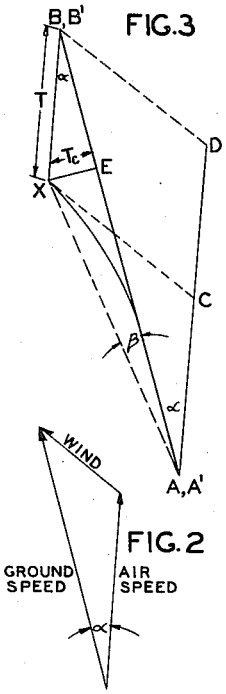
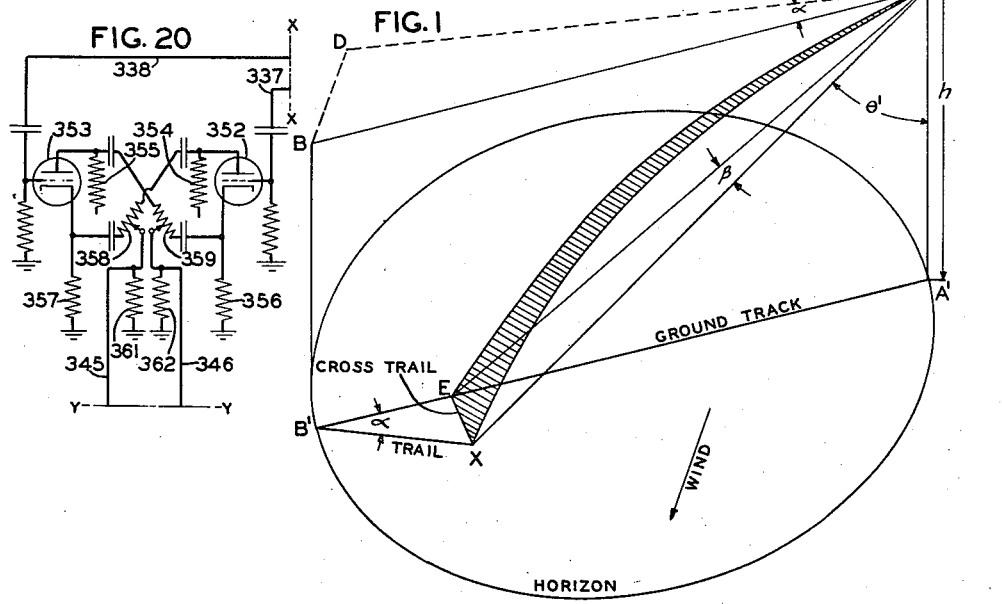
INVENTOR
JOSEPH J. CALDWELL, JR.
BY
ATTORNEY Sept. 6, 1960      J. J. CALDWELL, JR      2,952,014
OBJECT DETECTING AND LOCATING SYSTEM
Filed May 19, 1942      9 Sheets-Sheet 2

INVENTOR
JOSEPH J. CALDWELL, JR.
BY
ATTORNEY

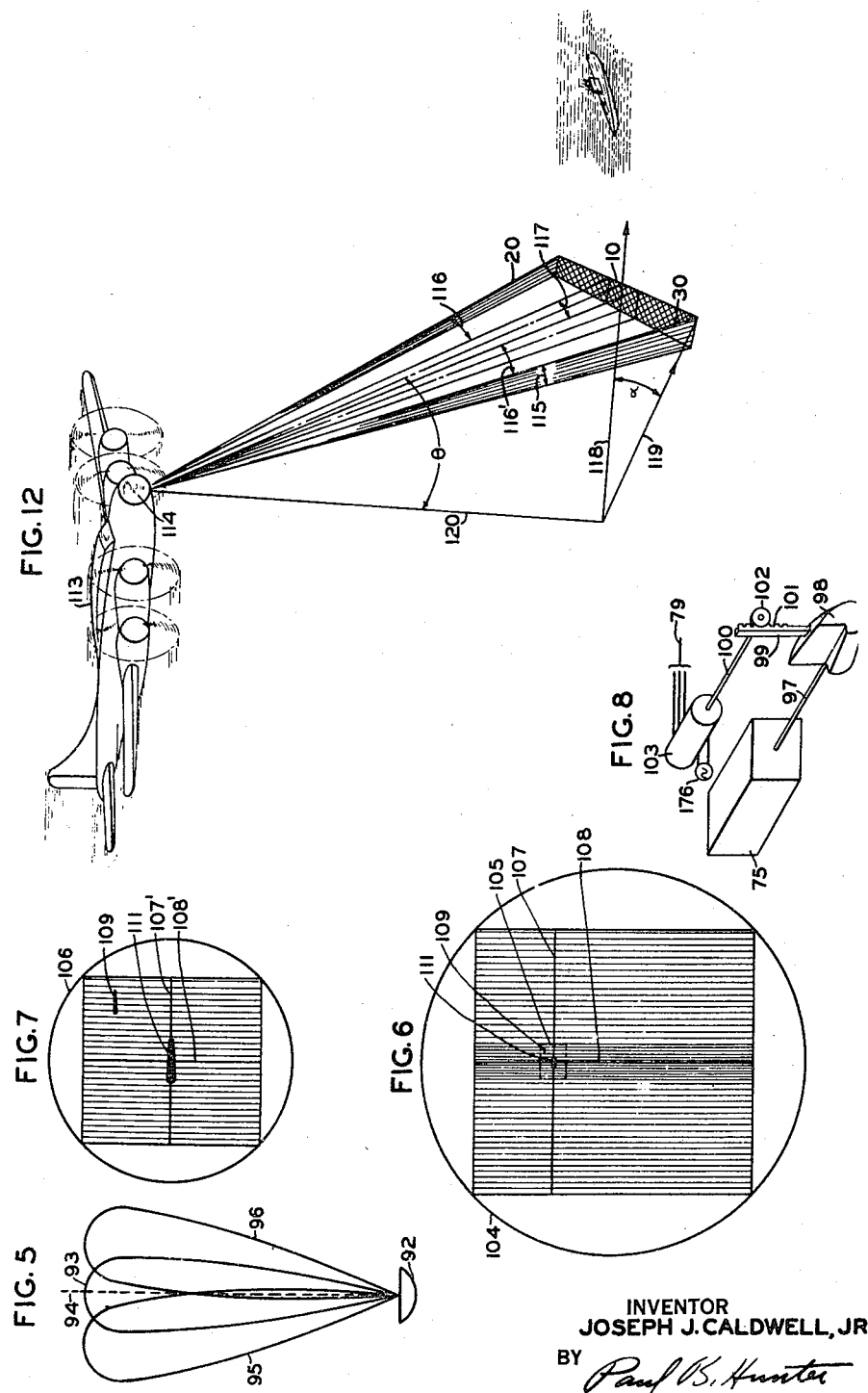

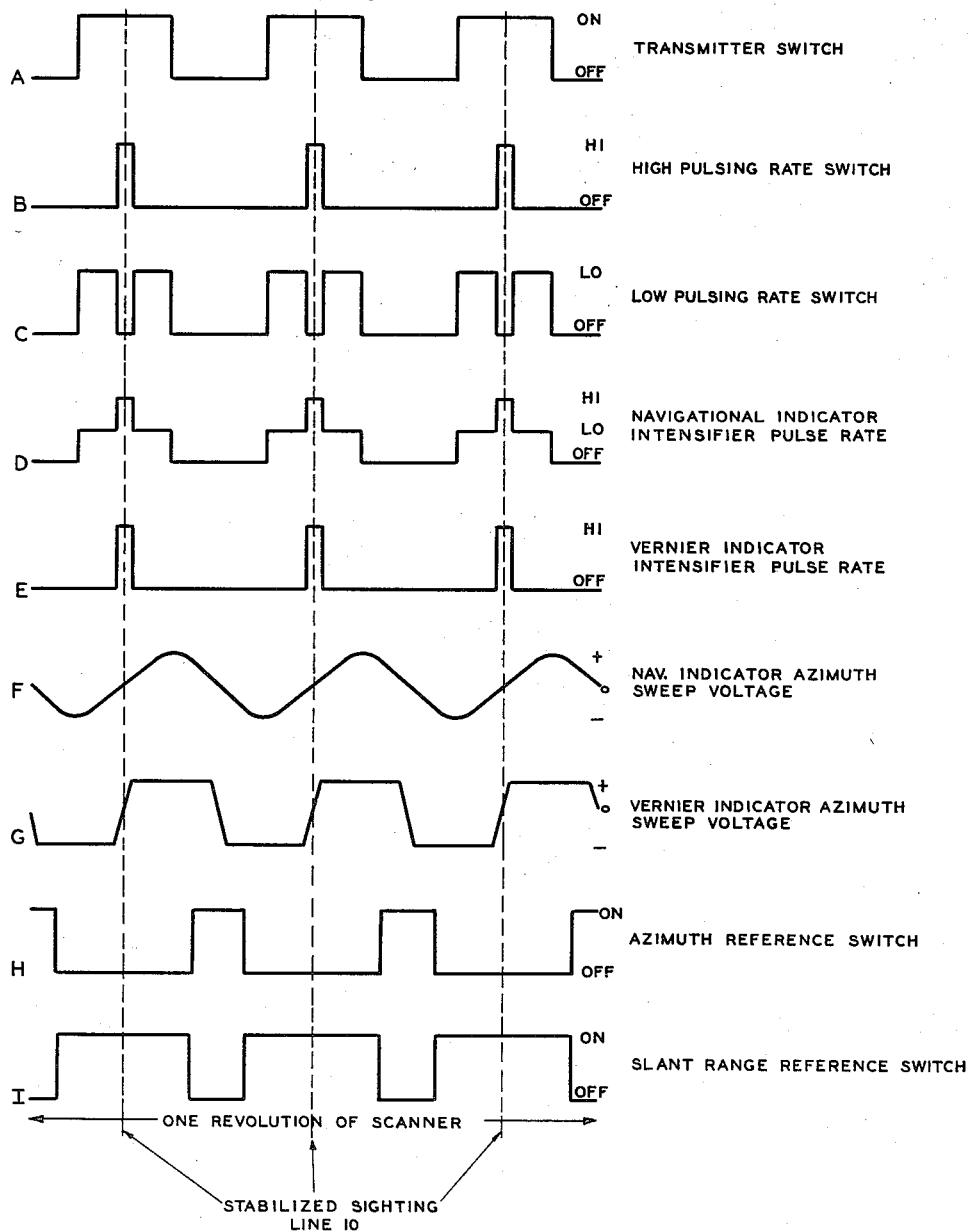

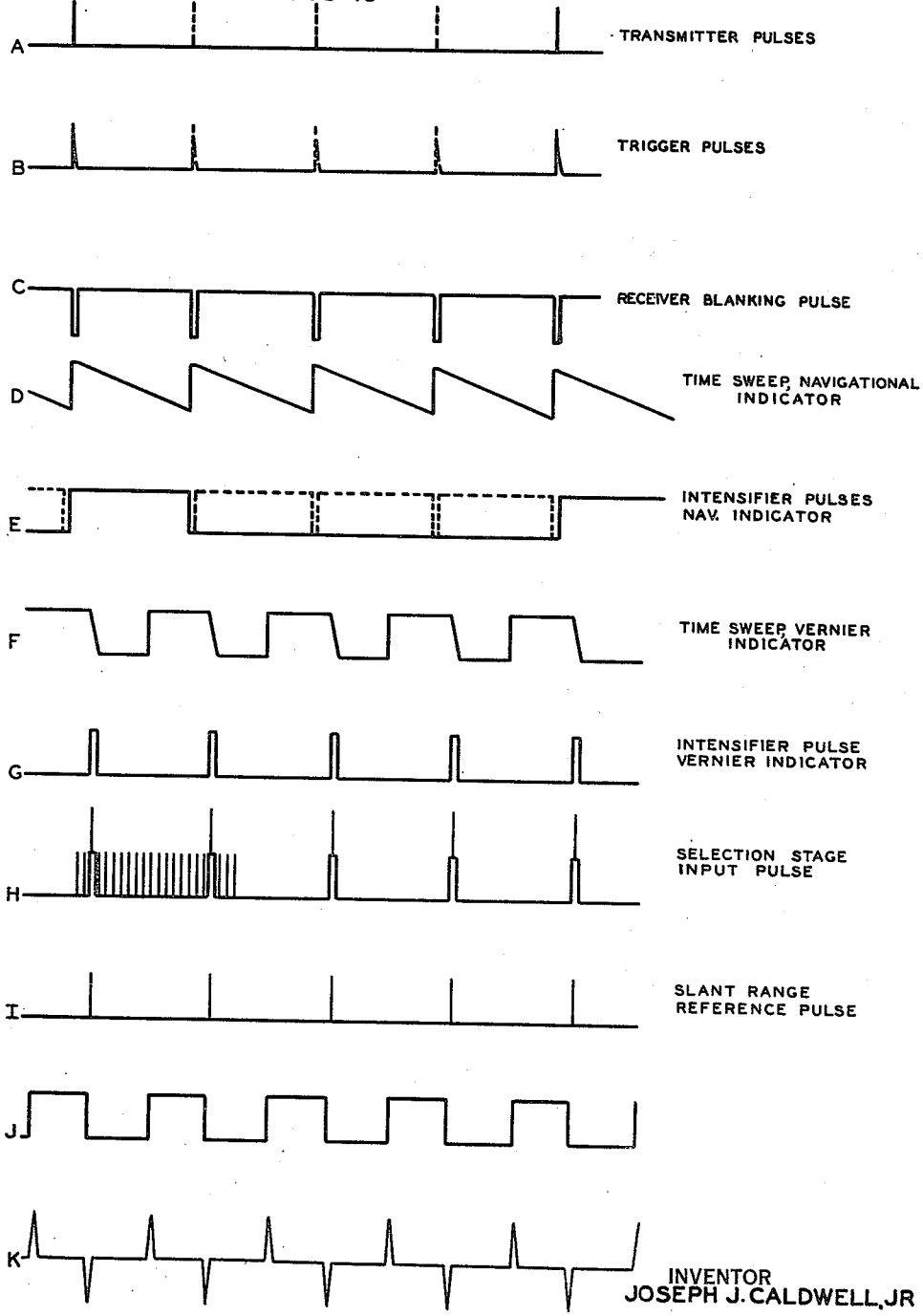

Sept. 6, 1960 J. J. CALDWELL, JR 2,952,014
OBJECT DETECTING AND LOCATING SYSTEM
Filed May 19, 1942 9 Sheets-Sheet 6
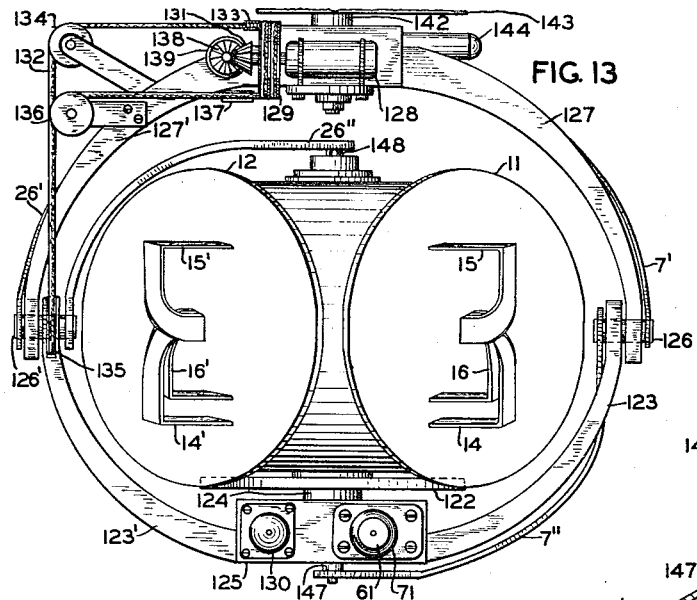
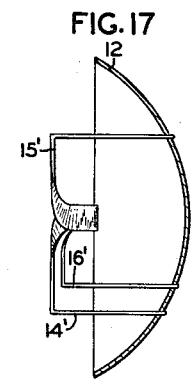
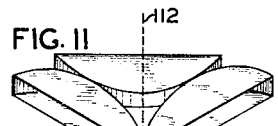
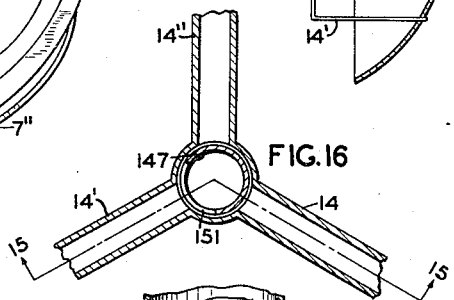
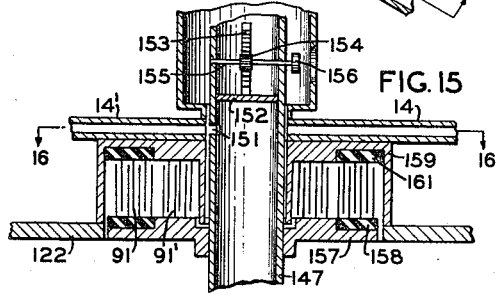
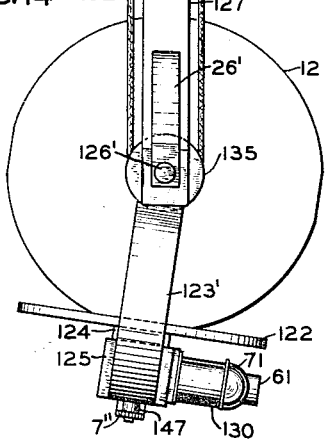
INVENTOR
JOSEPH J. CALDWELL, JR.
BY
ATTORNEY Sept. 6, 1960 J. J. CALDWELL, JR 2,952,014
OBJECT DETECTING AND LOCATING SYSTEM
Filed May 19, 1942 9 Sheets-Sheet 7

FIG.18

INVENTOR
JOSEPH J. CALDWELL, JR.
BY
Paul B. Hunter
ATTORNEY

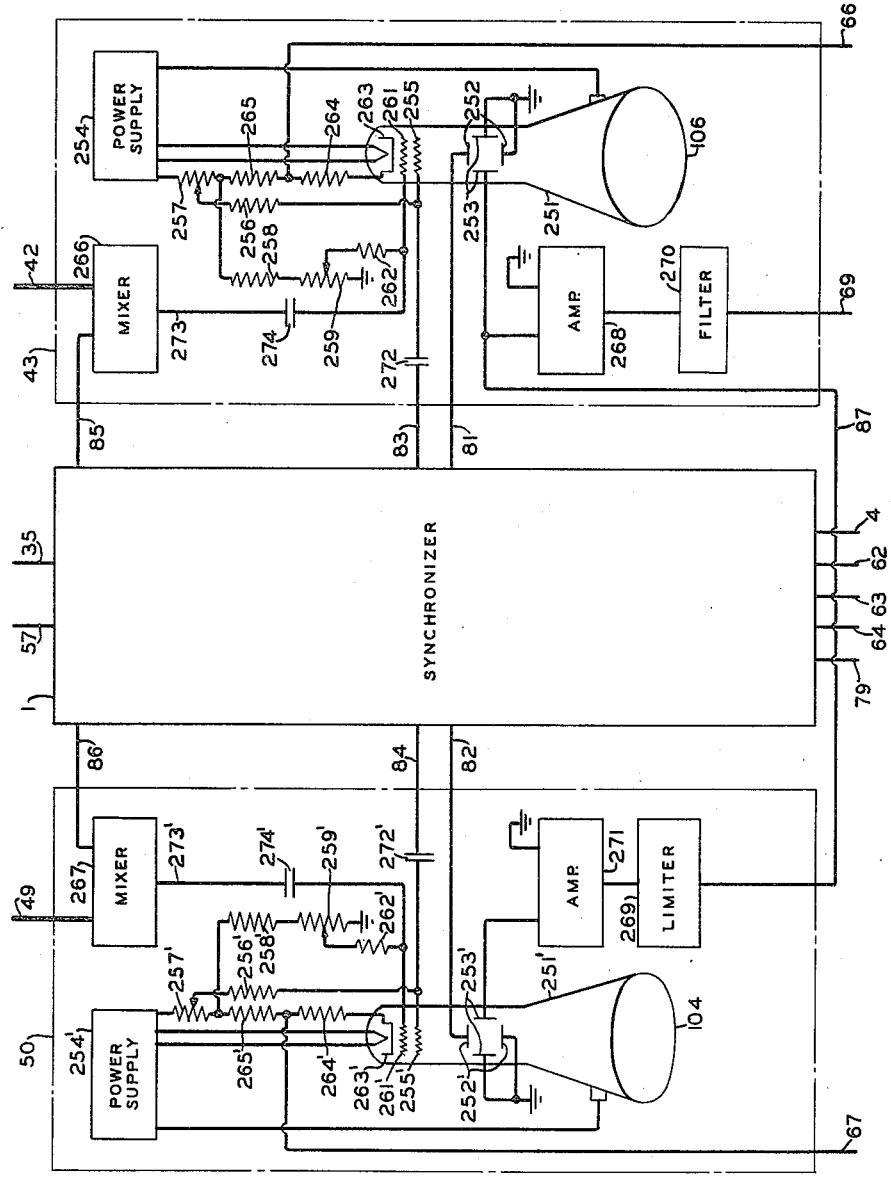

United States Patent Office 2,952,014
Patented Sept. 6, 1960

2,952,014

OBJECT DETECTING AND LOCATING SYSTEM

Joseph J. Caldwell, Jr., Merrick, N.Y., assignor to Sperry Rand Corporation, a corporation of Delaware Filed May 19, 1942, Ser. No. 443,573

8 Claims. (Cl. 343—11)

The present invention relates, generally, to the use of ultra high frequency electromagnetic radiation on mobile bodies for providing navigational information for use in navigating the body as when operating under overcast conditions or during periods of poor visibility as at night, the apparatus of this invention being suitable for use not only in maintaining a desired straight ground track, for determining drift angle, ground speed and detecting recognizable land marks, but being particularly adaptable for use in bombing or fire control operations, the apparatus serving for aligning the ground track of the craft with respect to a target and also serving to determine the slant range and other information with regard thereto.

In copending application Serial No. 406,494, now Patent No. 2,733,437 filed August 12, 1941, in the name of Lyman et al., entitled, "Radio Apparatus for Detecting and Locating Objects," there is disclosed an apparatus employing ultra high frequency radio scanning means together with intermittently operating transmitter and receiver means and indicator means controlled therefrom for giving the angular position and slant range with respect to an aircraft of the remote object scanned. The present invention discloses means that not only give the information provided by the apparatus of the above application but also furnish such precise angular measurements of the object with respect to stabilized space coordinates that, in conjunction with a computer mechanism, bombardment of optically obscured objects may be effected.

The solution to a bombing problem may be divided into two parts; means must be provided, first, for aligning the ground track of the bomber, and, second, for determining the range angle. The ground track is the path followed by the aircraft over the ground while the range angle is the angle forward of the true vertical at which the bomb must be released. In prior art, a stabilized optical system provided the ground track alignment and a computer mechanism provided the range angle determination. Bombardment missions must be carried out under conditions of good visibility favoring antiaircraft measures or under conditions of poor visibility when aim is uncertain and objectives may even entirely escape detection. The raido apparatus of the present invention fulfills the function of the stabilized optical system under visibility conditions which cause the latter to be ineffectual. The function of the computer mechanism remains unchanged.

It is, therefore, one of the objects of the present invention to provide radio means for use on mobile craft for aiding in the navigation of the craft and serving, among other things, to supply a computer mechanism, as in bombing or gun control operations, with necessary data including drift angle informtaion, slant range, azimuth angle and sighting angle of the target, the apparatus also being useful for indicating navigational land marks, for aiding in effecting instrument landings, for detecting enemy pursuit craft, and aiding in the directing of defensive fire.

Another object of the present invention is to provide radio means for use in controlling a computer mechanism and for aligning the ground track of an aircraft with respect to a target.

Yet another object of the present invention is to provide appartus employing ultra high frequency radio scanning means energized by intermittently operating transmitter means together with receiver means and indicator means actuated therefrom for giving the angular position and slant range of a remote object scanned with respect to space coordinates.

A further object of the present invention is to provide means for obtaining a highly directional indication of electromagnetic radiation from a remote object comprising, directive radiator means having partially overlapping spatial patterns of reception, a dual channel receiver for amplifying separately the energy contained in these spatial patterns, and a signal comparator for transmitting energy from the dual channels of the receiver to an indicator only when the energies from the two channels are of equal intensity.

A still further object of the present invention is to provide cathode ray indicator means for revealing the presence of a remote object, the positional data of said object being disclosed by use of reference traces drawn on said cathode ray indicator means by electronic means, said traces being independent of changes in the operating characteristics of said indicator means and its associated sweep circuits.

Another object is to provide a means of scanning a remote object or target with a directive beam of electromagnetic radiation, said scanning means being stabilized against yaw and pitch due to the motion of the aircraft or vehicle carrying the scanning means so that an indicator means controlled therefrom may at all times disclose true positional data of the remote object with respect to fixed space coordinates.

Still another object is to provide a means of scanning a remote object or target with a beam of electromagnetic radiation comprising directive radiator means supported by a frame and rotated in azimuth, said radiator means having generator means turned synchronously therewith for supplying a sweep voltage substantially proportional to the angle between the headings of the radiator means and the supporting frame, and means for adding a corrective voltage to said sweep voltage to compensate for the change of azimuth angle produced by a roll of said frame, so that the series combination of said voltages is substantially proportional to the azimuth angle between the above-mentioned headings.

Yet another object is to provide a means of scanning a remote object or target with a beam of electromagnetic radiation comprising preferably three directive reflectors excited by wave guides and placed back-to-back to form a symmetrical and compact mass and covered with dielectric material to obtain a substantially spherical exterior so that said reflectors may be rotated with a minimum of vibration, wind resistance, and gyroscopic moment.

A further object of the present invention is to provide a means of scanning a remote object or target with a beam of electromagnetic radiation emitted in pulses by an ultra high frequency transmitter, the rate of emission of said pulses being varied according to the changing direction of the beam to concentrate the radiation in a limited area, and vernier means utilizing this area of high resolution for indicating the position of the target with increased accuracy.

An object is to provide a receiver of a plurality of signals having a plurality of output paths at least one of which paths comprises a gated amplifier that amplifies only those signals received during a desired time interval, and an automatic volume control circuit actuated by the gated signals and acting on the receiver for adjusting the volume of all the signals according to the volume level of the gated signals.

Other objects and advantages will become apparent from the specification, taken in connection with the accompanying drawings wherein one embodiment of the invention is illustrated.

Fig. 1 is a perspective view illustrating factors affecting the alignment of an aircraft's ground track with respect to a target.

Fig. 2 is a vector diagram used for explaining the meaning of drift angle $\alpha$.

Fig. 3 is a projection of Fig. 1 upon the ground plane, showing the cross trail connection to the ground track.

Fig. 5 is a schematic view of idealized radiation patterns associated with the electromagnetic scanner of the present invention drawn in polar coordinates.

Figs. 6 and 7 are diagrams illustrating possible patterns of the navigational and vernier indicators, respectively.

Fig. 8 is a perspective view of the range control for converting from the tangent of the sighting angle to slant range.

Fig. 9 is a series of diagrams illustrating the switching sequences occurring during each revolution of the scanner plotted vertically in change of operation and horizontally in degrees of rotation.

Fig. 10 is a series of graphs illustrating idealized waveforms of pulses associated with the operation of the present invention reduced to unity magnitude and drawn horizontally in time from a common reference.

Fig. 11 is a schematic view of three cylindrical parabolic reflectors.

Fig. 12 is a pictorial view of an aircraft employing the apparatus of the present invention against a target on the ocean.

Fig. 13 is a front elevation view of the scanner assembly.

Fig. 14 is a side elevation view of the scanner assembly.

Fig. 15 is an elevation cross-section view of a portion of the scanner assembly taken along the cutting-plane line 15—15 of Fig. 16.

Fig. 16 is a plan cross-section of a wave guide valve taken along the cutting-plane line 16—16 of Fig. 15.

Fig. 17 is an elevation cross-section of a reflector showing the placement of the wave guides.

Fig. 18 is a schematic diagram illustrating the scanner stabilization and azimuth correction circuits.

Fig. 19 is a block diagram of a signal comparator.

Fig. 20 is a schematic diagram of a modified form of the portion of Fig. 19 between lines x—x and y—y.

Fig. 22 is a schematic diagram of the navigational and vernier indicators.

Figure 4:
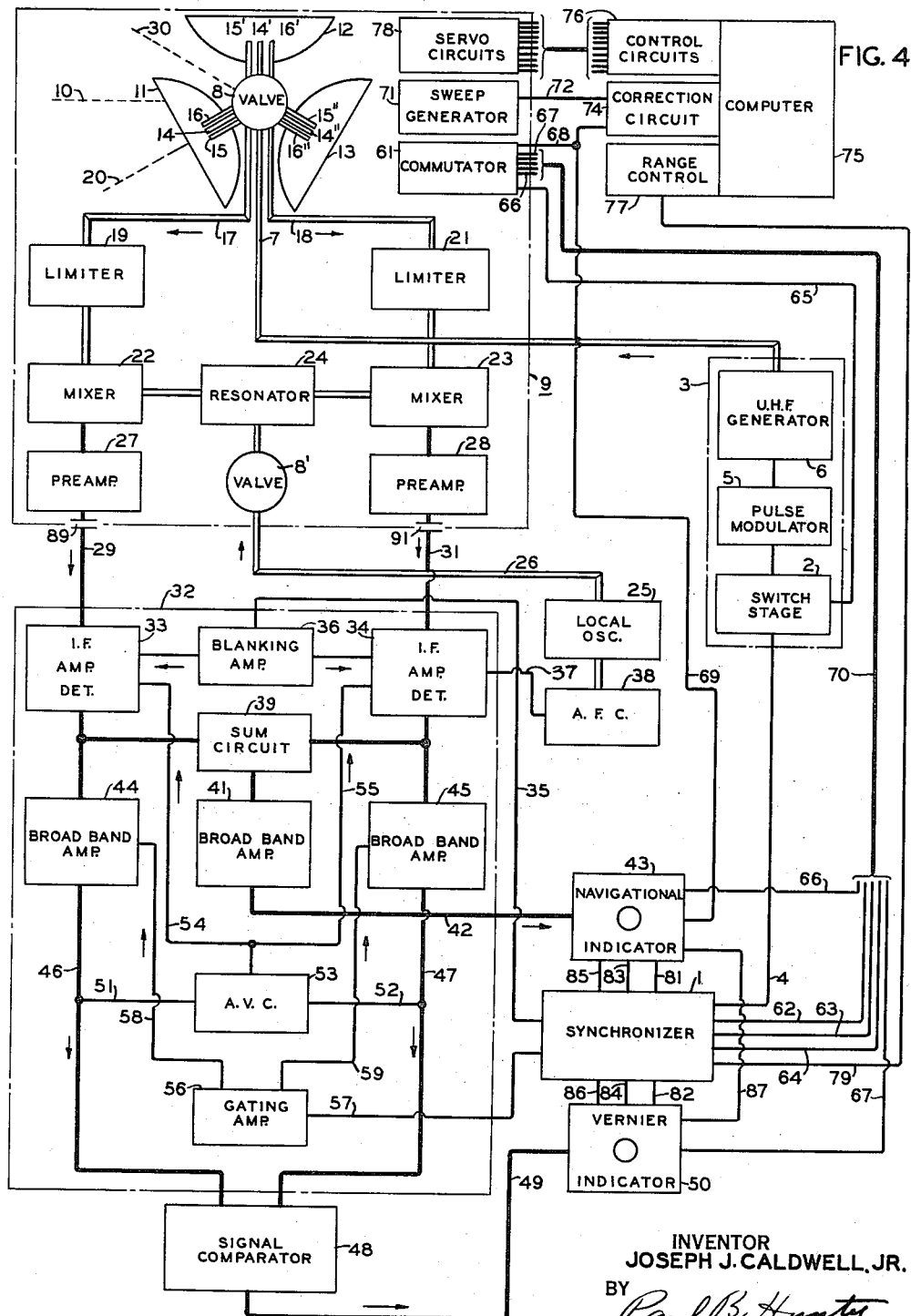
Fig. 4 is a block diagram of an embodiment of the present invention.

Since it is an object of the present invention to align the ground track of an aircraft with respect to a target, certain aspects of bombardment technique affecting the fulfillment of this object should be mentioned. Under usual bombing conditions it is not sufficient merely to align the aircraft's ground track or route traveled over the ground so that it passes through the target. This is because air resistance acts on a bomb in flight to retard its initial air velocity and lengthen the time of fall, thus allowing a cross wind to blow it off its initial course. The drift angle of the bomb increases as its forward air speed decreases while the drift angle $\alpha$ of the aircraft remains constant; consequently the point of impact of the bomb lies downwind from the aircraft's ground track. The ground track, therefore, must be turned through an angle $\beta$ in order that it pass to windward of the target at a distance just sufficient to compensate for the curving course of the bomb.

The correction $\beta$ to the ground track may be more clearly understood by reference to Figs. 1 and 3. An aircraft at a point A flying at a constant altitude $h$ above a ground point A' is assumed to have a certain air speed and encounter a wind as indicated vectorially in Fig. 2. The vector resultant of the wind velocity and air speed is the ground speed lying at the drift angle $\alpha$ from the air speed vector. The aircraft therefore heads along the line ACD, the wind blows parallel to lines DB and CX, and the ground track is the line A'EB'. If a bomb is released at point A, the horizontal projection of its trajectory follows the curved line from A' to X, the point of impact, while the aircraft reaches point B directly above B' during the same interval. The horizontal distance B'X, which the bomb lags behind the aircraft during the time of fall, is termed trail T. Trail is a function of the ballistic coefficient (air resistance) of the bomb, the altitude (air density and time of fall), and air speed of the aircraft. Trail may be determined from empirical tables for the particular type of bomb used by referring to the value corresponding to the readings of the aircraft's altimeter and air speed indicator. Since the distance AC parallel to the aircraft's air speed is proportional to the average forward air speed of the bomb, and CX is parallel and equal to DB because the effect of the wind is assumed the same on both the bomb and the aircraft, then from elementary geometric considerations the angle XB'E must be the drift angle $\alpha$. The distance XE equal to T sin $\alpha$ is termed the cross trail $T_c$. The angle $\beta$ is the angle subtended by the cross trail from the release point A. The angle A'AX is termed the range angle $\theta'$ at which the bomb must be released to reach the target at X. This angle $\theta'$ is, therefore, a special case of the angle $\theta$ which is termed the sighting angle. It will be seen that:

$$\tan \beta = \frac{T}{h} \sin \alpha \cos \theta' \qquad (1)$$

where $\beta$ is the angular correction to the ground track, T is the trail distance, $h$ is the altitude, $\alpha$ is the drift angle, and $\theta'$ is the range angle. In the present invention this correction is automatically applied by electrical means as disclosed with reference to Fig. 18.

Figure 21:
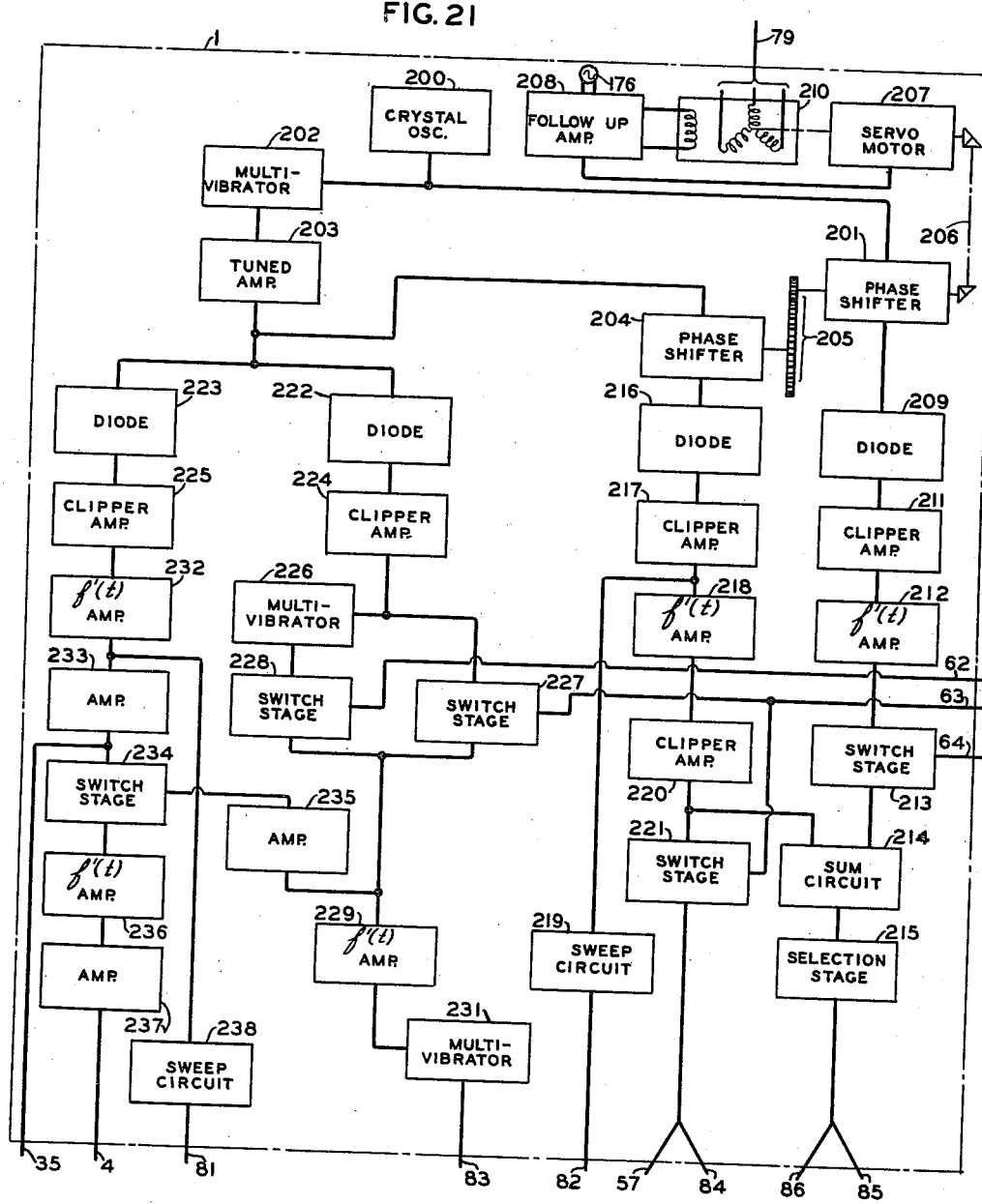
Fig. 21 is a block diagram of the pulse synchronizer.

Referring now to the principal embodiment of the present invention shown in Fig. 4, a synchronizer 1, discussed more fully with reference to Fig. 21, comprises a source of stable frequency from which a plurality of periodic control pulses are derived. The pulses, formed by the use of multivibrators, clippers, differentiators, and similar circuits, have different shapes, magnitudes, and durations according to the requirements of the controlled circuits, but these pulses have a common time reference because of their common origin.

The synchronizer 1 is connected by a trigger control lead 4 to the grid of a switch stage 2 in a transmitter 3. The switch stage output is joined to the input of a pulse modulator 5, which latter is connected to control the operation of an ultra high frequency generator 6 such as a magnetron. A wave guide 7 runs from the generator 6 to a wave guide valve 8 in a scanner assembly 9, discussed in detail with reference to Figs. 13 and 14.

The scanner assembly 9 is designed to furnish a mounting for a scanner having three degrees of freedom. The scanner comprises three directive reflectors 11, 12, and 13 rotatable as a unit at a substantially constant spin frequency about an axis passing through the center of the valve 8 and perpendicular to the plane of the figure. The spin axis can itself be turned clockwise or counterclockwise independently of the spin frequency about a concentric azimuth axis to determine the azimuth direction of a stabilized sighting line 10. The third degree of freedom allows the scanner to be turned around a sighting angle axis perpendicular to the sighting line 10 and to the spin and azimuth axes to determine the elevation of this sighting line. In short, the spinning scanner may be pointed to the right or left and up or down as is shown in detail in Figs. 13 and 14.

The reflectors 11, 12, and 13 forming the scanner may be cylindrical parabolas or paraboloids and may be identical, each being furnished with three open-ended wave guides. Wave guides 14, 14', and 14" have ends substantially at the focus of the reflectors 11, 12, and 13, respectively. Wave guides 15 and 16 have ends placed to the left and right, respectively, of the center guide 14 as viewed from the valve 8. Wave guides 15' and 16' are similarly placed with respect to center guide 14' and likewise wave guides 15" and 16" with respect to center guide 14". All the mouths of the guides face the surfaces of the reflectors containing them. Upon rotation of the reflectors about the valve 8, the transmitter wave guide 7 is connected in succession to the center guides 14, 14', and 14" while the left guides 15, 15', and 15" and the right guides 16, 16', and 16" are successively joined to left and right receiving guides 17, and 18, respectively. Suppose, for example, that the scanner rotation is clockwise, then a dashed line 20 may represent the direction in which the axis of each reflector points when its associated guides are connected to the stationary guides. The connection is maintained until the axis of the reflector in question points along a dashed line 30. The stabilized sighting line 10 or zero heading of the scanner assembly bisects the angle between lines 20 and 30. Fig. 4 illustrates reflector 11 pointing along line 20 at the commencement of its period of utilization. After reflector 11 has turned to the direction of line 30, there is a momentary disconnection of all wave guides until the axis of reflector 13 reaches the line 20 and a new period begins.

The center wave guides 14, 14', and 14" with their associated reflectors 11, 12, and 13, respectively, are designed to produce radiation patterns that are highly directive in the plane of rotation and have axes of symmetry that are identical with the principal axes of the reflectors. The left and right wave guides 15, 15', 15" and 16, 16', 16", respectively, use their associated reflectors to create directive receptive patterns that partially overlap in the plane of rotation. The axes of symmetry are at a slight equal angle to the right and left of the principal axes of the reflectors. The principal axes consequently are lines of equal receptivity or equi-signal lines. For illustration refer to Fig. 5 where a reflector 92 of the character described has a radiation pattern 93 having an axis of symmetry that is also the principal axis 94 of the reflector 92. Partially overlapping receptive patterns 95 and 96 have equal gains in the direction of the line 94.

Receiving wave guides 17 and 18 feed limiters 19 and 21, respectively. These limiters may be of the gaseous discharge type, known to the art, which consist of gas filled resonant chambers containing electrodes and maintained close to the ionization condition. The limiters are arranged to discharge when strongly excited and thus effectively damp the exciting oscillations. The lengths of the guides 17 and 18 are adjusted to reflect very high impedances at the mouths of the guides when a discharge shorts the resonant chambers.

Mixers 22 and 23, which may be of the crystal type, are coupled to the resonators of the limiters 19 and 21, respectively. Relatively weak energy may pass freely from the receiving wave guides to the mixers without exciting the limiters to the point of ionization. The mixers are also individually coupled to a resonator 24 which is excited by a local oscillator 25 placed external to the scanner assembly 9. The outputs of the mixers 22 and 23 are connected to the inputs of preamplifiers 27 and 28, respectively.

The limiters, mixers, preamplifiers, and the resonator are all mounted in close association with the reflectors 11, 12, and 13 so that the entire combination may rotate around the axis of valve 8. A valve 8', concentric with valve 8, provides a wave guide 26 from the external local oscillator 25 with a rotating joint to the resonator 24. The outputs of the preamplifiers 27 and 28 are connected to concentric lines 29 and 31, respectively, through circular condensers 89 and 91, respectively. The condensers serve as noiseless transitions from the rotating preamplifiers to the stationary lines. It is to be understood that other means such as slip rings and brushes may be employed to effect this rotatable connection.

The lines 29 and 31 leave the scanner assembly 9 and run to a dual channel receiver 32 where the line 29 connects to an intermediate frequency amplifier detector 33, and line 31 connects to a corresponding amplifier detector 34. Screen grids of tubes in the amplifiers 33 and 34 are maintained at a normal positive voltage and are attached to the output of a blanking amplifier 36. The input of the amplifier 36 is joined to the synchronizer 1 by a blanking pulse lead 35.

A lead 37 is attached to the intermediate frequency amplifier 34 for transferring some intermediate frequency voltage to an automatic frequency control circuit 38. The control circuit, known to the art, is connected to the tuning mechanism of the local oscillator 25.

The outputs of amplifier detectors 33 and 34 are coupled to a summation circuit 39 which is designed to add together the signals coming from both left and right channels. A broad band amplifier 41 is fed by circuit 39 and a lead 42 joins the amplifier 41 to a navigational indicator 43, shown in detail in Fig. 22.

The outputs of amplifier detectors 33 and 34 are also connected to separate broad band amplifiers 44 and 45. Left and right channel leads 46 and 47, respectively, run from the outputs of these amplifiers to the input of a signal comparator 48, discussed in detail with reference to Fig. 19. The comparator is designed to pass signals from the two channels over a lead 49 to a vernier indicator 50 only when the signals from the channels are equal in magnitude. If desired, the summation circuit 39 and the broad band amplifier 41 may be eliminated, and the lead 42 connected to the output of the signal comparator 48. Under these conditions the comparator is connected to supply identical signals to both the navigational and vernier indicators, 43 and 50, respectively.

The grid circuits of the intermediate amplifiers 33 and 34 are connected to the output of an automatic volume control circuit 53 through leads 54 and 55, respectively. The signal, from which the circuit 53 derives a controlling direct voltage, is obtained by shunt leads 51 and 52 tapping leads 46 and 47, respectively.

The screen grids of tubes in the broad band amplifiers 44 and 45 are not maintained at the usual positive voltage but are connected by leads 58 and 59, respectively, to the output of a gating amplifier 56. The input of the amplifier 56 is attached to the synchronizer 1 by a gating pulse lead 57.

A commutator 61 mounted in the scanner assembly is arranged to rotate at the frequency of scanning which is that multiple of the spinning frequency determined by the number of reflectors employed. In the illustrated embodiment of the invention, there are three reflectors; therefore the commutator 61 is geared up in a ratio of three to one. The commutator controls the operation of the transmitter, synchronizer, and the indicators through a complete cycle each time one reflector replaces the preceding reflector on the stabilized sighting line 10. The commutator 61 has a plurality of electrically isolated switch sections mounted on the same shaft, each section consisting of conducting and insulating segments against which are placed contact brushes. By the appropriate choice of the relative positions and extents of the conducting and insulating segments, the commutator sections may open or close circuits in series with their brushes at any desired moment during the scanning cycle. For this purpose a low pulsing rate switch section, a high pulsing rate switch section, and a slant range reference pulse switch section are connected by leads 62, 63, and 64, respectively, to the synchronizer 1. An azimuth reference switch section connects to the navigational and vernier indicators 43 and 50, respectively, by leads 66 and 67, respectively. Leads 62, 63, 64, 66, and 67 are grouped in a cable 70. An azimuth sweep shorting switch section of the commutator 61 connects by a lead 68 to a lead 69 running to the navigational indicator. A transmitter switch section is joined to the screen grid circuit of the switching stage 2 by a lead 65.

A sweep generator 71 is mounted in the scanner assembly 9 and is driven synchronously with the commutator 61. A lead 72 places the output of generator 71 in series with the output of an azimuth correction circuit 74, discussed more fully with reference to Fig. 18. This circuit introduces certain voltage corrections according to the setting of a computer mechanism 75 with which it is associated, and the combined sweep generator and correction circuit outputs are supplied over the lead 69 to the navigational indicator 43.

The indicators 43 and 50, discussed in detail with reference to Fig. 22, are designed to provide patterns on cathode ray oscilloscope screens traced by electron beams whose intensity is proportional to the signals received over leads 42 and 49, respectively. Time sweep leads 81 and 82 from the synchronizer 1 provide vertical beam control proportional to slant range. The lead 69 provides the navigational indicator 43 with horizontal beam control proportional to the scanning angle while an azimuth sweep lead 87 from device 43 connects to the vernier indicator 50 for the same purpose. Intensifier pulse leads 83 and 84 are provided from the synchronizer 1 to the indicators 43 and 50, respectively, for the purpose of turning on the electron beams only during the reception of useable signals.

A possible navigational indicator pattern, shown in Fig. 6, embraces the entire scanning angle from line 20 to line 30 of Fig. 4. The stabilized sighting line 10 is marked by a vertical trace 108 substantially in the middle of the screen 104. The available distance scale starts from substantially zero at the bottom of the screen and runs to a slant range equal to one-half that distance travelled by electromagnetic radiation in the shortest interval between transmitter pulses.

A possible vernier indicator pattern, shown in Fig. 7, is restricted to a small area such as that indicated by dashed lines 105 on the navigational indicator screen 104. This small area is spread over the useable surface of the vernier indicator screen 106. The vernier pattern covers a narrow angle on either side of the stabilized sighting line 10 of Fig. 4 which latter is marked by a vertical trace 108' substantially in the middle of the screen 106. The depth of slant range covered by the vernier pattern is only a fraction of the total available. Slant range reference pulse leads 85 and 86, shown in Fig. 4, running from the synchronizer 1 to indicators 43 and 50, respectively, provide for the introduction of horizontal slant range reference traces 107 and 107' defining the center of the vernier indicator distance scale on screens 104 and 106, respectively. Objects 109 and 111 appearing on the navigational indicator screen 104 are revealed in magnified form on the vernier indicator screen 106. A range control 77 responsive to the computer mechanism 75 is connected by lead 79 to the synchronizer 1 to cause the latter to shift the center of the vernier indicator's distance scale to any desired portion of the navigational indicator's scale.

The computer mechanism 75 is not limited to any specific embodiment, but it may be, for example, of the general type disclosed in U.S. Patent No. 2,162,698, issued June 20, 1939 in the names of Earl W. Chaffee and Hugh Murtagh. The computer's task is to determine the range angle $\theta'$, that sighting angle at which a bomb must be released from an aircraft, flying a properly aligned ground track, to strike a desired target. This range angle is a function of altitude, time of fall, trail, and ground speed which factors must be supplied to the computer to enable it to accomplish its purpose. Once the ground track has been aligned as has been previously discussed with reference to Figs. 1 to 3, the the necessary factors with the exception of ground speed may be predetermined by auxiliary means such as tables and set into the computer manually. Ground speed is determined by the generally known synchronous method. Rate of change of sighting angle is used by computer 75 in combination with the known altitude of the aircraft to compute the horizontal velocity with which the aircraft is approaching the target. Under conditions of poor visibility, sighting angle and ground speed measurement must be obtained indirectly from the slant range determinations of indicators 43 and 50, since the angular width of the scanning beam emitted by the scanner assembly 9 is too broad in the vertical plane to provide a determination of the sighting angle, based upon the direction of the beam's principal axis sufficiently accurate for bombing purposes. As a result of the azimuth angle vs. slant range type of indication provided by the present radio apparatus in contrast to the purely angular information obtained from the optical sighting device normally associated with the computer 75, the actual elevation angle of the scanning beam is immaterial as long as the target is irradiated with sufficient energy to cause an image to appear on the indicating screen. The range control 77 is provided to convert from the circuits in the synchronizer 1, producing the slant range reference trace, to the ground speed mechanism in the computer.

The range control 77 seen in detail in Fig. 8 is associated with the ground speed shaft 97 of the computer 75, which is given by the computer mechanism or angular adjustment proportional to $$\tan \theta \text{ or } \frac{R}{h}$$

where $R$ is the horizontal range to a target, $h$ is the altitude, and $\theta$ is the sighting angle. The altitude adjustment is manually introduced into the computer according to the indications of either a sensitive altimeter or the actual ground clearance corresponding to the slant range revealed by the indicators 43 or 50 of the terrain immediately below the aircraft. The usual displacement and rate control knobs associated with the computer 75 permit adjustment by the bombardier of the magnitude and time rate of change of $R$ to such values that because of the functional relationship between $R$ and $R_s$, the slant range reference trace can readily be superimposed on the target image on the indicator screens and their respective movements synchronized. The necessary functional interconnection which enables $R_s$ to be regulated by the conventional computer controls $h$ and $R$ is now discussed. Attached to the shaft 97 in the range control is a three-dimensional cam 98 shaped to displace a cam follower 99 radially a distance proportional to the cosecant of the sighting angle when rotated. The cam may be translated along the axis of the shaft according to the altitude setting of the computer. The longitudinal section of the cam has a linear slope such that the cam follower is displaced radially a distance proportional to the altitude. Since the angular adjustment of the cam is proportional to $$\frac{R}{h}$$

and the displacement of the cam follower with respect to the cam is proportional $$\frac{h}{\sin \theta}$$

the effective lift of the cam follower is proportional to $$\frac{R}{\sin \theta} = R_s$$

where $R_s$ is the slant range. The cam follower is attached to a rack 101 which drives a pinion 102 on the shaft 100 of a self synchronous transmitter 103. The transmitter rotor winding is connected through a cable 79 to the synchronizer 1 while the stator is energized from an alternating current source 176.

Control circuits 76, associated with the computer 75, utilize servo circuits 78 mounted in the scanner assembly 9 for stabilizing the scanner against yawing to the right or left and pitching up and down. Control and servo circuits 76 and 78, respectively, discussed with reference to Fig. 18, also rotate the stabilized sighting line 10 to right or left through the drift angle and up and down according to the sighting angle desired. For every setting of sighting angle there will be a corresponding slant range position transmitted to the synchronizer 1 by the range control 77, and represented on the indicators by a slant range reference trace.

In the operation of the form of the invention disclosed in Fig. 4 the transmitter 3 may be made active by supplying a screen grid voltage over the lead 65 to the switch stage 2 from the transmitter switch section of the commutator 61 in the sequence A of Fig. 9.

Trigger pulses of a form shown in graph B of Fig. 10 are produced by the synchronizer 1 in part at a high rate as controlled by the high pulsing rate switch section of the commutator 61 through the lead 63 in the sequence B of Fig. 9. The remainder of the trigger pulses are generated at a low rate as controlled by the low pulsing rate switch section of the same commutator through the lead 62 in the sequence C of Fig. 9. The trigger pulses impressed on the switch stage 2 by lead 4 are amplified because the tube now has screen grid voltage. The amplified pulses reach the modulator 5 which momentarily reduces the bias on the ultra high frequency generator 6 so that high intensity pulses of very short duration are produced, substantially as illustrated in graph A of Fig. 10. The transmitter pulses have a rate identical to sequence D of Fig. 9. It is seen that the low pulsing rate prevails except over a small angle symmetrically placed with respect to the stabilized sighting line 10. The wave forms drawn with dash lines in graphs A and B of Fig. 10 represent those pulses which are added to the low pulse rate to produce the high rate. The transmitter pulses flow through the wave guide 7 to the valve 8.

The transmitter pulses are emitted by the scanner as it rotates, the wave guide valve 8 having a switching cycle similar to that of the transmitter switch. The transition from guide open to closed is more gradual than from transmitter on to off, but it is immaterial since no energy flows during this interval. The radiated pulses not only travel out into space but attempt to pass down the receiving guides 17 and 18. Due to the intensity of the pulses the limiters 19 and 21 discharge, shorting the resonant chambers and reflecting high input impedances at the scanner end of the wave guides. Thus negligible radiation is dissipated and little is passed to the mixers 22 and 23.

To further insure that no direct energy reaches the indicators 43 and 50, a receiver blanking pulse may be employed. This pulse, illustrated in Graph C of Fig. 10, commences shortly before and ends shortly after the transmitter pulse. The blanking pulse is continuously generated by the synchronizer 1 at the high pulse rate and requires no switching. The pulse is fed from the synchronizer 1 through the lead 35, is amplified by amplifier 36, and applied to the screen grids or cathode circuits of the intermediate frequency amplifiers 33 and 34 with the correct polarity to make the dual channel receiver 32 insensitive to the transmitter pulse.

The pulses emitted by the scanner travel outwards at the speed of radiation until they strike a remote object and are reflected back, returning to the scanner after a time interval proportional to the distance to the object. These relatively weak returned signals pass through the limiters 19 and 21 without causing a discharge and are converted to an intermediate frequency in the mixers 22 and 23 by beating with the frequency from the local oscillator 25. The preamplifiers 27 and 28 amplify the signals and supply them to the dual channel receiver 32 where they are amplified and detected by devices 33 and 34.

From the detectors 33 and 34 the incoming signals take two paths. The summation circuit 39 combines the signals from the left and right channels which, after passing through the amplifier 41, are fed to the navigational indicator 43. The signals from the left and right channels are also amplified by amplifiers 44 and 45, respectively, when the latter are operative and are then fed to the signal comparator 48. This comparator supplies the vernier indicator 50 with only those signals that come from the instantaneous direction of the equi-signal line of the active reflector.

A gating pulse is generated by the synchronizer 1 with a shape identical to vernier indicator intensifier pulses shown in graph G of Fig. 10 which are caused by a switching cycle E, Fig. 9 controlled by the high pulsing rate switch section of commutator 61 through the lead 63. The gating pulse is supplied from the synchronizer 1 by the lead 57 to the amplifier 56 which applies it to, say, the screen grids of tubes in the amplifiers 44 and 45 to make the latter circuits operative. Only those signals received within the duration of the gating pulse can pass through the amplifiers 44 and 45, be compared in magnitude and phase in the comparator 48, and reach the vernier indicator 50. The mid-point of the gating pulse and the pulse producing the slant range trace which marks the center of the vernier indicator's distance scale may be concomitantly shifted in time anywhere between successive transmitter pulses by the action of the range control 77 as discussed in detail with reference to Fig. 21. This selective action greatly improves the signal to noise ratio in the signal comparator 48.

The automatic volume control is derived by the circuit 53 from the gated output of the amplifiers 44 and 45 and is applied over leads 54 and 55 to the grid circuits of amplifiers 33 and 34, respectively. The volume of all the received signals is adjusted according to the volume level of the gated signals. Thus the signals reaching the comparator 48 cannot overload the dual channel receiver 32 and destroy the highly directive response. This gated automatic volume control prevents undesired strong signals outside the slant range limits of the vernier indicator's pattern from suppressing weak signals within these limits.

The signals appearing on the screen of indicator 43 form a navigational picture covering perhaps 60° of azimuth angle and perhaps 15 miles of slant range. When to conserve transmitter power club-shaped scanning beams are employed only a horizontal strip on the screen of the indicator 43 is utilized at a time. If the beam is very narrow the height of this strip is approximately proportional to the slant range multiplied by the product of the beam angle in radians and the secant of the sighting angle as measured from a vertical line beneath the craft upwards. The portion of the screen that is utilized therefore increases rapidly as the sighting line 10 is raised towards the horizon.

Cylindrical reflectors of parabolic section, such as those shown in Fig. 11 where line 112 represents the spin axis, may be used to scan with fan-shaped beams. This mode of operation covers substantially the entire screen of indicator 43 but requires many times the transmitter power. If desired, combinations of fan and pencil beams may be employed or pencil beams whose principal axes maintain a slight angle with respect to each other in the elevational plane so that partially overlapping areas are scanned.

The patterns of both indicators 43 and 50 repeat at a frame frequency equal to the scanning frequency. The scanning frequency, therefore, must be high enough to prevent objectionable flicker. It is desirable for mechanical reasons to retain a low spin frequency, but no limit other than a practical one is placed on the number of scanning beams employed. To reduce flicker further, moderately long persistence screen material is used. The fading time is short, however, compared to the movement of signals across the screen.

If it is desired to track a particular group of signals, such as 111 of Figs. 6 and 7, representing a target, the control circuits 76 may be used to cause azimuthal rotation of the scanner assembly 9 by the servo circuits 78 so that the stabilized sighting line 10 as represented by the azimuth reference trace 108 on the screen of the indicator 43 lies vertically through the middle of the target. The control circuits 76 may also be used to cause elevational rotation of the scanner by the servo circuits 78 so that the stabilized sighting line 10 assumes a sighting angle corresponding to the value of the slant range reference trace 107 when the latter lies horizontally through the middle of the target representation 111.

The target indication 111 now lies substantially at the center of the vernier indicator 50. Not only does the target appear here in amplified form, but it lies in the zone of high pulse rate. This of course means that more pulses are transmitted per degree of scanner rotation, more pulses impinge upon the target, and, therefore, increased resolution is obtained on the indicator screen. In general it is not practical to pulse the transmitter at the high rate over the entire scanner sweep angle because of the limitations of the available primary power and the allowable transmitter dissipation. For this reason the high pulse rate may be restricted to a central zone corresponding roughly to the field covered by the reticle of a prior art computer. The resolution cannot, however, be improved unlimitedly by indefinitely increasing the pulse rate in this area because the time interval between pulses would be so reduced as to seriously restrict the useful slant range. The employment of a high pulse rate zone is in no way restricted to the illustrated method. It may be desirable to swing the center of the high pulse rate scanning sector back and forth over the entire scanning angle at some low speed, as when searching for an object. This may readily be accomplished by driving the high pulse rate switch section of the commutator 61 through one input of a differential gearing while the other input may be used to introduce mechanical phase shift between the position of the rotating scanner and the switch section. It seems evident that the center line of the high pulse rate sector may thus be placed manually or by motor means anywhere within the low pulse rate scanning limits. Alternatively it may be advantageous to transmit only at a low pulse rate while searching and then switch to a high pulse rate while tracking a target. This method provides a uniform energy distribution over the entire scanning area during periods of searching with a permissible increase in pulse rate to maintain a constant transmitter dissipation.

In a technique, well known to pilots, the aircraft carrying the apparatus of the present invention may be headed in such a direction that the target when split by the azimuth reference trace 108' moves down the vernier indicator screen 106 without deviating to the right or left of the trace. Under these conditions it seems evident that the ground track or route over the ground will carry the aircraft directly above the target. If now the slant range reference trace 107' is synchronized by adjusting the speed of the computer's ground speed shaft which drives the range control 77 so that it travels down the screen in superposition with the target, the speed of closing with the object is given by the computer setting. Trail correction, previously mentioned, is introduced into the computer, the reference traces slightly readjusted, and when the sighting angle $\theta$ becomes $$\theta' = \tan^{-1} \frac{\text{ground speed} \times \text{time of fall} - \text{trail}}{\text{altitude}} \quad (2)$$

the conditions for bomb releases are attained.

Referring now to Fig. 12, an aircraft 113 is carrying an embodiment of the present invention. The scanner assembly 9 of Fig. 4 is preferably mounted in nose 114 of the aircraft in front of the bombardier's position. The nose 114 consists predominately of dielectric material conductive to radio waves though not necessarily transparent. This allows the radiation and reception of electromagnetic energy over a broad field of view without obstruction from the metallic structure of the craft. The aircraft is heading along line 119 at the drift angle $\alpha$ from the ground track 118. The sighting line 10 is aligned with the ground track and at a sighting angle $\theta$ from the vertical line 120 beneath the aircraft. A club-shaped beam is employed in Fig. 12, covering the angle marked by the reference numeral 115. The scanning operation begins at line 20 and ends at line 30. The pulses are transmitted at the low rate as the beam sweeps the angles marked by the reference numerals 116, 116'. The numeral 117 refers to the angle during which the transmitter is pulsed at the high rate. The area scanned is seen to be roughly rectangular, increasing in size with increase in altitude and with increase in sighting angle. This area may be shifted to the right or left of the line 119, representing the aircraft's heading, to allow for any drift angle encountered, and the area may also be moved from the vertical line 120 beneath the aircraft forward almost to the horizon. If the cylindrical reflectors of parabolic section of Fig. 11 were employed, the beam angle referred to by numeral 115 would cover substantially the entire forward quadrant.

Referring now to Figs. 13 and 14, certain mechanical aspects of the scanner assembly 9 are shown. The reflectors 11, 12, and 13 are mounted back to back on a turntable 122. Situated in the space behind the reflectors and therefore hidden from view is the radio apparatus included in the scanner assembly 9 of Fig. 4. The turntable 122 is supported on a hollow shaft 124 projecting from a gear box 125. A scanning motor 130, bolted to the gear box 125, has a worm gear on its shaft which engages a ring gear on the shaft 124. Therefore the turntable 122 carrying the reflectors 11, 12, and 13 and the above-mentioned radio equipment is turnable about what may be defined as the spin axis. The commutator 61 is mounted coaxially on the sweep generator 71, and the combination is fastened to the gear box 125 and driven from the shaft 124 through a one to three gear ratio. Arms 123 and 123' are secured to the gear box 125 to form a U-shaped frame which is suspended on hollow trunnions 126 and 126' between the arms 127 and 127', respectively, of a yoke. The frame 123, 123' is turnable in elevation about an axis which may be defined as the sighting angle axis. The arms 127 and 127' are bolted to a gear box 141 to which is fastened an elevation servo motor 128. The motor 128 has a grooved drum 129 and a bevel gear 131 mounted on its shaft. A cable 132 is laid into the grooves of the drum 129, led around a pulley 133, over a pulley 134, and down to a sheave 135, fixed to the arm 123' of the U-shaped frame. The cable 132 is secured to the lowest point on the sheave 135, run up over a pulley 136, around a pulley 137, and up into the grooves of the drum 129. The cable 132 is fastened to the drum 129 at the midpoint of the winding. The bevel gear 131 engages a similar gear 138 on the shaft of a self-synchronous motor 139, a device well known to those skilled in the art, mounted on the gear box 141. The shaft of the motor 139 is arranged to turn in unison with the frame 123, 123'; consequently this motor may be used to indicate the angular displacement of the frame 123, 123' with respect to the yoke 127, 127'.

The entire scanner assembly 9 of Fig. 4 is rotatably suspended on a hollow shaft 142 rigidly mounted to a structural beam 143 of the aircraft. The shaft 142 is held by thrust bearings in the gear box 141. An azimuth servo motor 144 fastened to the gear box 141 is mechanically connected to the shaft 142 to enable the yoke 127, 127' and attached apparatus to be turned in azimuth relative to the heading of the aircraft about what may be termed the scanner azimuth axis. A self-synchronous motor 145, seen in Fig. 14, is mounted on the gear box 141 and geared to turn at the same speed as the yoke 127, 127'. A flexible shaft 146 is also connected to the gear box 141 for mechanically transmitting the angular relationship of the yoke to the aircraft heading to control equipment discussed with reference to Fig. 18.

The transmitter and local oscillator wave guides 7 and 26, respectively, of Fig. 4 enter the scanner assembly through the hollow shaft 142. Valves of the general type shown in Fig. 16 and discussed below connect guides 7 and 26 to guides 7' and 26', respectively. Guides 7' and 26' emerge from the hollow yoke arms 127 and 127', respectively and connect to the outside ends of hollow trunnions 126 and 126', respectively. A wave guide 26" is rotatably attached to the inner end of trunnion 126', swings in an arc to the top center point between the reflectors 11, 12, and 13, and is fixed to a cylindrical pipe 148. A wave guide 7" is rotatably attached to the inner end of trunnion 126, passes through the arm 123, and is fixed to a cylindrical pipe 147.

Referring now to Fig. 15, a mode converter 149, a type of bulbous stub antenna, projects through a hole in the wall of the rectangular wave guide 7" into the cylindrical pipe 147. The pipe 147 passes through the gear box 125, the hollow shaft 124, and the turntable 122 into the space within the reflectors 11, 12 and 13. At a point along the length of the pipe 147 marked by the cutting-plane line 16—16 a rectangular window 151 is made in the wall of the pipe. At this point the open ends of wave guides 14, 14', and 14" abut the pipe with a free running fit. Fig. 16 shows that the window 151 covers a much wider angle than that subtended by the openings of the wave guides. This enables the guides to be fully energized during the entirety of each scanning operation. A shorting plug 152 is placed in the pipe 147 beyond the window 151. A rack 153, fixed to the plug 152, engages a pinion 154 on a shaft 155. The shaft 155 is rotatably mounted in the walls of the pipe 147 and may be turned by a knob 156.

A circular plate 157, fastened to the pipe 147, has a free running fit with the turntable 122. A flat toroid 158 of dielectric material is set into the plate 157. A series of thin concentric metallic rings are embedded in the plate 157 and another series of similar rings of larger diameter are pressed into the dielectric toroid 158. A member 159 corresponding to plate 157, is fixed to the turntable 122 and has a flat toroid 161 of dielectric material suspended opposite toroid 158. A series of concentric metallic rings embedded in the dielectric material 161 interleave with the opposite rings in the material 158 to form the condenser 91. In a similar manner, rings secured to the upper member 159 fit into the interstices between the concentric rings on the bottom plate 157 to form a condenser 91'. This latter condenser, not shown in Fig. 4, is merely a low impedance path for the grounded shield on the concentric line 31 of that figure.

The cylindrical pipe 148 has concentric condensers one only of which is shown by 89, Fig. 4 substantially the same as condensers 91 and 91' shown in Fig. 15. The pipe 148 is cut by a window in its side wall to feed the resonator 24, shown in Fig. 4, in much the same manner as in Figs. 15 and 16. Of course there is only one connecting wave guide and not three as in the former case. The window in the pipe 148 occupies almost the entire circumference of the pipe; consequently the resonator 24 has almost uninterrupted energy flow from the local oscillator 25. A shorting plug similar to plug 152 in Fig. 15 is employed, and the entire structure is implied by the valve 8' block symbol of Fig. 4.

The valve 8 of Fig. 4 includes three identical structures, the transmitter unit being illustrated in Fig. 16. For reference numbers 14, 14', 14" and 7" one can substitute 15, 15', 15" and 17, respectively, or 16, 16', 16" and 18, respectively. Naturally wave guides 17 and 18, feeding the limiters 19 and 21, shown in Fig. 4, do not appear in Figs. 13 and 14 because the received energy is converted to intermediate frequency before it leaves the spinning portion of the scanner assembly by way of the condensers 89 and 91, 91'.

Referring now to Fig. 17, there is shown the wave guides of reflector 12 in a possible physical arrangement. Transmitter guide 14' projects through the reflector 12 with its small dimension in the plane of the figure. The guide 14' makes a right angle turn in the plane of the figure, extends towards the center line of the reflector, makes another right angle turn in the plane of the figure while twisting a quarter turn longitudinally. The guide 14' stops with its end at the focus of the reflector, pointing toward the reflecting surface, and with the broad side of the guide in the plane of the figure. The receiving wave guides 15' and 16' have substantially the same configuration and line up on either side of the center wave guide 14'.

In the operation of the structure shown in Figs. 15 to 17, the wave guide 7", the pipe 147, and the plate 157 with the lower portions of condensers 91, 91' remain stationary while the turntable 122, wave guides 14, 14', 14", and the member 159 with the upper portions of condensers 91, 91' rotate around the former at the spin frequency. Energy is propagated down the guide 7" with the electric vector transverse to the guide and in the plane of the figure. The mode converter 149 absorbs the energy and reradiates it in the pipe 147 with the electric vector longitudinal to the pipe. Since the electric vector is still transverse to the guides 14, 14', and 14" and in the plane of the figure, energy may pass through the window 151 and propagate down the guides as each guide rotates in turn before the window. It is to be recalled that the transmitter is not operative during the transition periods between completely open guides. Because of the configuration of the guides in front of the reflectors, it is seen that the electric vector undergoes a quarter turn, and therefore horizontally polarized waves are transmitted and received. Vertical polarization can also be employed, but the receiving guides for obvious physical reasons cannot be placed so close to the focus of the reflectors. Under these conditions the partially overlapping lobes of reception 95 and 96, as shown in Fig. 5, diverge from the principal axis 94 of the associated reflector to a greater extent.

Referring now to Fig. 18, there is illustrated schematically the functional relationship between the scanner assembly 9 and the control and correction circuits 76 and 74, respectively, shown in Fig. 4. The reflectors 11, 12 and 13, turnable about the scanner spin axis, are supported by the U-shaped frame 123, 123' to which are attached the scanning motor 130, the commutator 61, and the sweep generator 71. The frame 123, 123', turnable about the sighting angle axis, is supported by the yoke 127, 127'. The elevation servo motor 128 and associated self-synchronous motor 139 are diagrammatically represented as mounted on the yoke 127, 127' concentric with the sighting angle axis. The yoke 127, 127' is turnable about the scanner azimuth axis by the azimuth servo motor 144 which, with the associated self-synchronous motor 145, is represented concentric with this axis. The flexible shaft 146 shown in Fig. 14 is here represented as a continuation of the scanner azimuth axis to a horizon gyroscope 162. The gyroscope 162, having self-synchronous transmitters 163 and 164 mounted thereon, may rest on a turntable, not shown, geared to the shaft 146 of Fig.

14. The gyroscope 162 with accompanying transmitters 163 and 164 is caused to follow the movement of the scanner assembly 9 in azimuth about the scanner azimuth axis. This equipment may be mounted directly on the scanner yoke, if desired, and the flexible shaft 146 may be omitted. Thus oriented the horizon gyroscope responds to the roll and pitch of the scanner in space rather than the roll and pitch of the aircraft. Transmitter 163 picks off pitch indications from the gyroscope 162 so that the axis passing through its rotor 165 may be defined as the scanner pitch axis. Transmitter 164 picks off roll indications from the gyroscope 162 so that the axis passing through its rotor 166 may be defined as the scanner roll axis.

A sighting angle shaft 167 serves as an axle for rotors 168 and 169 of self-synchronous transmitters 171 and 172, respectively. The shaft 167 may be angularly adjusted by a knob 173 or by an arc tangent cam actuated by shaft 97 in the computer mechanism. The stator windings 174 and 175 of transmitters 171 and 172, respectively, are excited by the common alternating current source 176. The three phase rotors 177 and 168 of motors 139 and 171, respectively, are electrically interconnected. A lead 178 from the stator winding 179 of motor 139 connects with the single phase rotor winding 165 of the transmitter 163. A lead 181 from the rotor 165 and a lead 182 from the other end of the stator winding 179 feed the input circuit of a follow-up amplifier 183. The alternating current source 176 supplies a phase reference voltage to the amplifier and excites the stator winding 184 of the transmitter 163. The amplifier 183 has a push-pull output load 185 which forms the center-tapped field winding of a direct current generator 186. The armature 187 of the generator 186 is rotated through a shaft 188 by a motor 189. The output of the armature supplies the power for the elevation servo motor 128, whose field may be separately excited.

A drift angle knob 191 which may be mounted in the computer mechanism turns a shaft 192 on which is mounted the rotor 193 of a self-synchronous motor 194. The shaft 192 is connected through bevel gears 195 to the frame of a self-synchronous motor 196 so that the stator winding 197 may, in effect, be turned with respect to its three phase rotor winding 198. Winding 198 is electrically interconnected with the rotor winding 199 of motor 145. A directional gyroscope 301 maintains the rotor 198 substantially stabilized in azimuth about an axis which may be defined as the aircraft azimuth axis. The stator winding 197 of motor 196 feeds a follow-up amplifier 302 similar to amplifier 183. The alternating current source 176 excites the stator winding 303 of motor 145 and supplies a reference voltage to the amplifier 302. Amplifier 302, connected in a manner corresponding to amplifier 183, energizes a center-tapped field winding 305 of a direct current generator 306, whose armature 307 is driven through a shaft 308 by a motor 309. It is to be understood that a single motor may drive both generators 186 and 306. The output of generator 306 serves as a voltage source for the azimuth servo motor 144 whose field may be separately excited.

A trail altitude knob 311 actuates a sliding contact 312 on a potentiometer 313 whose resistance is connected across the output of a balanced rectifier 314. The balanced rectifier 314, well known to those skilled in the art, rectifies the alternating voltage induced across leads 315 and 316 of the rotor winding 193 and the alternating voltage developed across leads 316 and 317 of the same winding, bucking the resultant two direct voltages against each other. The rotor winding 166 of motor 164 feeds a similar balanced rectifier 318. The single phase rotor winding 169 of transmitter 172 supplies the input of a buffer amplifier 319, the output of which energizes shunt connected stators 321 and 322 of motors 164 and 194, respectively. One lead 323 from the output of balanced rectifier 318 connects to one end of the potentiometer 313 while the other side of the rectifier 318 output goes by a lead 324 to the high potential side of the output of an amplifier 325 whose input is supplied by the sweep generator 71 over lead 72. The lead 69 is connected to the sliding contact 312 of the potentiometer 313 and runs to the navigational indicator 43 as shown in Fig. 4. Thus the outputs of balanced rectifier 318 and amplifier 325 and the tapped portion of the potentiometer 313 are all in series so that their respective voltages add vectorially.

In operation, the sighting angle shaft 167 may be turned to cause the zero-line of the scanner to follow a target. The alternating magnetic field of the stator 174 induces voltages in the branches of the rotor winding 168 according to the angular relationship between the rotor and the stator. Current proportional to these induced voltages flows in corresponding branches of the rotor winding 177, and there is a resultant alternating magnetic field produced in this winding which rotates synchronously with the turning of the rotor 168 on the shaft 167. In the quiescent condition the vector representing the field in winding 177 is at right angles to the stator winding 179; consequently there is no voltage induced in the stator by the rotor. When the shaft 167 is turned, the magnetic field vector rotates and flux couples with the stator winding 179, inducing a voltage therein. The phase of the induced voltage reverses at the point of zero coupling because the component of the flux inducing the voltage changes direction.

The presence of a pitch with respect to the zero heading of the scanner or azimuth bearing of the sighting line 10 of Figs. 4 and 12 causes the rotor 165 of the motor 163 to alter its normal position of zero coupling with the stator 184. The voltage induced in the rotor is substantially proportional to the sine of the pitch angle and reverses phase according to whether the pitch is above or below the horizontal plane. The vectorial sum of the induced voltages in rotor 165 and stator 179 is fed into the amplifier 183. The input to amplifier 183 is there compared with the reference voltage 176 as to phase. The output excites the field winding 185 of the generator 186 with a direct voltage whose magnitude is substantially proportional to the input to the amplifier 183 and whose direction reverses with phase reversal of this input. A power amplification is obtained by using the generator 186 because only the field control need be supplied by electronic means and the motor 189 delivers most of the power. The generator 186, thus controlled, drives the elevation servo motor 128 so that the scanner not only is caused to follow the adjustment of the shaft 167 but also corrects for any pitch. When the scanner is realigned the input to the amplifier 183 is zero, and the elevation servo motor is supplied no power. Thus, the true sighting angle θ of the scanner with respect to the horizontal plane may be continuously read from a calibrated scale on the knob 173.

In operation the drift angle shaft 192 may be adjusted to maintain the zero heading of the scanner parallel to the course or ground track of the aircraft, the effects of yaw being corrected automatically. Stator winding 303 induces voltages in the branches of rotor winding 199, and therefore a magnetic field is produced in the connected rotor winding 198. Upon turning the stator 197 with respect to the rotor 198 through the drift angle α by the shaft 192, the stator winding is angularly displaced with respect to its normal position of zero coupling with the rotor field. The voltage induced in the stator 197 feeds the amplifier 302 which controls the output of the generator 306. The azimuth servo motor 144 thereupon turns the scanner zero heading through the drift angle α and equilibrium is again achieved because the field vector of winding 198 is rotated to the position of zero coupling with the stator 197.

The directional gyroscope 301 which positions the rotor 198 is caged in the horizontal fore and aft axis of the aircraft. It is uncaged at the beginning of a bombing approach and thereafter retains its direction in space independent of the aircraft. The gyro axis lies on the heading of the aircraft at the moment of uncaging. Since the rotor 198 is stabilized on the aircraft azimuth axis the presence of yaw causes the stator 197 to rotate around the rotor and a signal is produced which makes the follow-up system turn the scanner to compensate for this yaw. Thus the scanner zero heading is fixed in space at a predetermined drift angle $\alpha$ from the azimuth axis of the aircraft at the beginning of the approach.

It has been shown that the scanner is stabilized against pitch and yaw motion by use of elevation and azimuth servo systems, respectively. Since it is not mechanically convenient to add another axis of rotation and accompanying servo equipment to the scanner, it is necessary to compensate electrically for the effects of roll on the apparent azimuth angle. Since the apparent width of a remote object is proportional to the azimuth angle which it subtends, it is logical to depict the object on an indicating device of a width proportional to this angle. It will be seen on consideration that:

$$\delta' = \delta + \phi \cos \theta \qquad (3a)$$

where $\delta'$ is the true azimuth angle, $\delta$ is the apparent scanner azimuth angle, $\theta$ is the sighting angle measured from the true vertical to the object, and $\phi$ is the roll angle measured about the horizontal projection of the line of sight. Now $\sin \phi$ is within one percent of $\phi$ for angles less than 14 degrees, which roll angle is virtually never exceeded when the aircraft is controlled by an automatic pilot. Therefore Equation 3a may be expressed as:

$$\delta' = \delta + \sin \phi \cos \theta \qquad (3b)$$

Recalling Equation 1 expressing the angle subtended by the cross trail from the release point and combining Equations 1 and 3b we have:

$$\delta'' = \delta' + \tan \beta \qquad (4)$$

or $$\delta'' = \delta + \sin \phi \cos \theta + \frac{T}{h} \sin \alpha \cos \theta' \qquad (5)$$

where $\delta''$ is the azimuth angle corrected for roll and cross trail.

The method of obtaining the above mentioned corrections to the azimuth angle in terms of voltages will now be disclosed. The rotor 169 is so aligned with respect to its stator 175 that the voltage induced in the former is proportional to the cosine of the sighting angle or cos $\theta$. This alternating voltage is amplified in the buffer amplifier 319 and the output energizes stators 321 and 322. The pick-up of rotor 166 is proportional to the sine of the roll angle or sin $\phi$, and therefore the direct current output of rectifier 318 is proportional to both the stator field and the pick-up or to sin $\phi$ cos $\theta$. The pick-up of rotor 193 which is proportional to the sine of the drift angle or sin $\alpha$ is applied by leads 315, 316, and 317 to the balance rectifier 314, the direct current output of which is therefore proportional to sin $\alpha$ cos $\theta$. This latter current is impressed on the potentiometer 313 which taps off a voltage proportional to the trail divided by the altitude or $T/h$. The sweep generator 71 may for convenience produce a sinusoidal wave, illustrated in graph F of Fig. 9, rather than a saw-toothed voltage proportional to the apparent azimuth angle or $\delta$, without affecting bombing accuracy. It is seen in the above-mentioned graph that the generator 71 produces a complete cycle of sweep voltage for each reflector employed. The phase is adjusted so that the voltage is passing through its zero point in a positive direction at the moment a reflector points along the sighting line 10 of Figs. 4 and 12. The amplifier 325 raises the magnitude of the sweep voltage and the two direct voltage corrections generated in the rectifiers 314 and 318 are added in the output circuit in series by leads 323 and 324.

The effect of the correcting voltages is to shift the zero point of the sweep voltage to the right or left of the sighting line 10 and thus alter the position of the image of the target on the indicator screens 104 and 106 of Figs. 6 and 7, respectively. Without correction the image would move across the screens an amount proportional to the roll angle multiplied by the cosine of the sighting angle. The proportionality constant of the roll correcting voltage is so chosen with respect to the sweep voltage that no apparent shift of the image occurs with limited roll about the sighting line. The proportionality constant of the cross trail factor is likewise so chosen that an aircraft previously aligned on the target must turn through an azimuth angle equal to that momentarily subtended by the cross trail in order to bring the image of the target back on the azimuth reference trace. It seems evident that when the aircraft reaches the range angle $\theta'$ the cross trail will be correctly taken into account.

Referring now to Fig. 19, there is shown a block diagram of one form of the signal comparator 48. Lines 46 and 47 from the left and right receiver channels, respectively, feed a summation circuit 331 consisting of a diode 332 for the left line and another diode 333 for the right line having a common output. The summation circuit 331 supplies the input of a buffer amplifier 334 which in turn connects to a control stage 335. An output amplifier 336, actuated by the control stage, excites the vernier indicator 50 through the lead 49. Shunt leads 337 and 338 tap the left and right lines 46 and 47, respectively, lead 338 connecting directly to a difference circuit 339 while lead 337 passes through a unity gain inverter 341 to reach the same circuit. The difference circuit 339 comprises an amplifier 342 for lead 338 and an amplifier 343 for the inverter stage 341 having a common output. The difference circuit 339 connects to a mixer circuit 344 by two separate paths, leads 345 and 346. The mixer consists of detector amplifiers 347 and 348 having outputs in common. The amplifiers are biased at cut-off; consequently only positive signals are amplified. Lead 345 from the difference circuit 339 runs directly to the input of the detector amplifier 347 while lead 346 from the same source passes through a unity gain inverter stage 349 to reach detector amplifier 348. The output of the mixer 344 feeds a control voltage amplifier 351 that connects with the cathode circuit of the control stage 335, which latter is normally biased close to cut-off.

In the operation of Fig. 19 the signal comparator 48 receives positive pulses of equal or unequal amplitudes from the left and right receiver channels 46 and 47. The pulses are added together in the summation circuit 331, amplified in the buffer stage 334, and applied to the grid of the control stage 335. These same pulses also travel through the shunt leads 337 and 338 to the difference circuit 339. The inverter 341 reverses the polarity of the pulse on lead 337; consequently the outputs of amplifiers buck each other. The resultant pulse is positive or negative dependent upon which channel supplies the greater signal. If the output of the difference circuit is a negative pulse, the signal cannot travel on lead 345 through the detector amplifier 347, but must take lead 346, be reversed in the inverter 349, and then as a positive pulse be amplified by detector amplifier 348. If the output of the difference circuit 339 is a positive pulse, the signal is reversed by the inverter 349 creating a negative pulse which cannot pass the detector amplifier 348, but the signal can be directly amplified by amplifier 347. It is thus seen that, regardless of polarity, a pulse, created in the difference circuit because of inequality in the outputs from the receiver channels, produces a unidirectional signal for the control voltage amplifier. When actuated by a signal, the control voltage amplifier 351 provides a pulse that drives the bias of the control tube 335 beyond cut-off. Therefore, no pulses reach the output amplifier 336 and the vernier indicator 50 except those coming from the instantaneous direction of the equi-signal line 94 formed by the partially overlapping receptive patterns 95 and 96 of the directive radiators, as shown in Fig. 5. The buffer amplifier 334 is used to isolate the control pulses from the diodes 332, 333 of the main circuit while these diodes prevent feedback of pulses from one channel into the other. Balance may be assured in the two channels by adjusting the relative gains until the vernier indicator pattern has best definition.

Fig. 20 illustrates a modified portion of the signal comparator 48 which eliminates the inverters 341 and 349. Shunt leads 337 and 338 tapping the left and right lines 46 and 47, respectively, connect to the grids of similar tubes 352 and 353, respectively. The tubes 352 and 353 have plate load resistors 354 and 355, respectively, and cathode load resistors 356 and 357, respectively, all of equal value. The plate and cathode loads of tube 352 are connected through blocking condensers and potentiometers 358 and 359, respectively, to the cathode and plate loads, respectively, of tube 353. Taps on potentiometers 358 and 359 connect to ground through resistors 361 and 362, respectively. The input leads 345 and 346 of detector-amplifiers 347 and 348, respectively, are connected across the resistors 361 and 362, respectively. The remainder of the circuit is unchanged from Fig. 19.

In the operation of Fig. 20 when equal pulses are applied to the grids of tubes 352 and 353, substantially equal voltages appear across all the loads. The plate pulses are, however, reversed in phase from the cathode pulses. Under these conditions the taps on the potentiometers 358 and 359 are adjusted to approximately the middle, that point where the opposed IR drops in the resistors 361 and 362, coupled to both cathode and plate circuits, cancel out. There is no voltage impressed on either detector-amplifier 347 or 348 and, therefore, no control voltage applied to the control stage 335. The equal pulses, combined in the sum circuit 331, pass through this control stage to the vernier indicator 50 unimpeded.

When the pulses fed to the signal comparator 48 are unequal, a control voltage is produced which biases the control stage 335 beyond cut-off. Say, for example, that the right channel 47 receives a greater positive pulse than the left channel 46. The absolute magnitude of the positive voltage across the cathode load 356 is greater than the absolute magnitude of the negative voltage across the plate load 355. A positive voltage appears across the input resistor 362 of the detector-amplifier 348 which is detected and amplified to be used as the control voltage. A negative voltage appears across the input resistor 361 of the detector-amplifier 347, but being unable to pass the detector, leaves the following circuits unaffected. When the left channel 46 supplies the greater magnitude positive pulse, it is readily seen that the roles of resistors 361 and 362 are interchanged and detector-amplifier 347 is now actuated.

The comparator 48 is not limited to the modifications shown. For example, it may be desirable to eliminate the summation circuit 331, supplying the input of the buffer amplifier 334 from only one channel of the receiver at a time. With this form of the invention, a channel reversing switch may be provided to determine equal channel gains and thus maintain correct bearings on the indicator screen. Any inequality of gain causes the oscilloscope pattern to shift slightly upon reversing lines 46 and 47 and therefore may be readily corrected.

The operation of the synchronizer 1 may be more clearly understood by reference to Fig. 21. A crystal oscillator 200 produces a sinusoidal voltage of stabilized frequency which is fed to the input of a phase shifter 201. This voltage is also injected into a multivibrator 202 to synchronize the latter on an exact submultiple frequency. A tuned amplifier 203 smooths the output of the multivibrator into a sine wave which is supplied to a phase shifter 204.

Phase shifters 201 and 204 have air condensers which permit continuous phase variation, and the latter possess linear calibration characteristics. In other words, the constants of the phase shifters are such that the changes in phase of the impressed voltages are directly proportional to the rotation of the respective variable condensers. The phase shifters are mechanically ganged together by gearing 205 in such a ratio that the oscillator and multivibrator frequencies are delayed the same time interval in passing through their respective circuits. Thus, if the ratio of the oscillator to multivibrator frequency is $n$, then the phase shifter 201 is geared to shift the higher frequency at $n$ times the speed that the phase shifter 204 shifts the lower frequency.

The geared combination of device 201 and 204 is driven by a servo motor 207 through bevel gears and shafting 206. The motor 207 is operated by a follow-up amplifier 208 of the general design discussed with reference to Fig. 18. A self-synchronous receiver 210 has its rotor mounted on the shaft of motor 207 while the rotor winding connections are diagrammatically illustrated by the lead 79 from the range control 77. The stator winding supplies the control input of the follow-up amplifier 208, and the source 176 supplies the necessary phase reference voltage.

The output of phase shifter 204 is rectified by diode 216 to form half-sine waves. A clipper amplifier 217 straightens the sides and flattens the top of the half-sinusoidal output of diode 216 to produce substantially square waves as shown in graph J of Fig. 10. The square pulses are supplied to a sweep circuit 219 where they overcome the bias on a tube whose cathode is isolated from ground by a condenser. When the tube conducts, the condenser is charged. A pentode, acting as a constant current device, shunts the condenser so that at the termination of the positive pulse the charge may leak to ground at a substantially linear discharge rate. The lead 82 is attached to the high side of the condenser, and the voltage appearing across the latter is used for the vernier indicator time sweep. This sweep, shown in graph F of Fig. 10, has a constant positive value for the duration of the controlling pulse, which is of course a half cycle of the multivibrator 202 frequency. At the end of the pulse, the voltage drops linearly with time to zero, where it remains until the beginning of a new pulse raises it abruptly to its former value and the cycle repeats.

The clipper-amplifier 217 also feeds a differentiating amplifier 218, a device well known in the television art. A very small input coupling condenser makes the grid responsive to the time rate of change of the impressed voltage. This differentiated wave is illustrated in graph K of Fig. 10 where a sharp positive pulse is produced by the abrupt front of the impressed square wave and a similar negative pulse is formed by the sudden end of the square wave. The leading pulse is suppressed in the associated clipper-amplifier. The trailing pulse is supplied to a clipper-amplifier 220 which shapes the trailing pulse into a form illustrated in graph G of Fig. 10. The clipper-amplifier 220 supplies one input of a summation circuit 214 which comprises two amplifiers working into a common load. The clipper-amplifier 220 also feeds a switch stage 221 whose screen grid voltage is applied through the high pulsing rate lead 63 in the sequence B of Fig. 9. Thus controlled by the commutator 61 of Fig. 4, the stage 221 provides the voltages for the gating pulse lead 57 and the vernier intensifier lead 84. It will be observed that the vernier indicator time sweep starts at the end of the rectangular pulse from the clipper-amplifier 217, and the gating and intensifier pulses are formed from the same trailing edge; therefore all three pulses are in phase.

The output of phase shifter 201 is rectified by diode 209, acted upon by clipper-amplifier 211, and sharpened into pulses by a differentiating amplifier 212 in a manner similar to the action of the corresponding devices 216, 217, and 218, respectively, on the lower frequency of the multivibrator 202. A switch stage 213, similar to stage 221, has its screen grid voltage applied over the slant range reference switching lead 64 in the sequence I of Fig. 9. The train of pulses from amplifier 212 is interrupted by the stage 213 and applied to the second input of the summation circuit 214.

In the summation circuit 214, the pulses of the frequency of the oscillator 200 and the pulses of the frequency of the multivibrator 202 are superimposed to produce the composite wave form shown in graph H of Fig. 10. Every nth higher frequency pulse comes at the center of the lower frequency pulse creating a momentary potential of perhaps twice that of the neighboring pulses. Since the phase shifters 201 and 204 are geared to produce the same time delay, the pattern H may be moved backward or forwards in time without changing the relative positions of the low and high frequency pulses.

The summation circuit feeds a selection circuit 215 which may comprise a gas tube held at a large negative bias and having a very short delay line as a plate load. The delay line is charged through a high resistance by the plate supply voltage. Only the composite pulses from the summation circuit are positive enough to fire the gas tube which short circuits the load and passes a surge of current. This discharge is reflected by the end of the delay line as a negative current surge which almost instantaneously cancels the current flow through the tube. The delay line is recharged relatively slowly through the high resistance by the plate supply in preparation for the next composite pulse. The potential drop appearing across a cathode resistance is applied to the leads 85 and 86 for the slant range reference pulse, shown in graph I of Fig. 10. Not only is this pulse extremely narrow, but its positioning is very accurate. Although the periodicity of the slant range reference pulse is that of the multivibrator 202, it is observed that the timing is accomplished in the phase shifter 201 at n times the frequency and therefore with n times the accuracy attainable with the phase shifter 204 if the latter were used alone.

The tuned amplifier 203 of Fig. 21 supplies diodes 222 and 223 with a sine wave of constant phase. The diodes 222 and 223 feed half-sinusoidal waves to clipper-amplifiers 224 and 225, respectively. The square wave output of amplifier 224 synchronizes a multivibrator 226 on an exact submultiple frequency and also supplies the input of a switch stage 227. The constants of the multivibrator 226 are adjusted so that the pulses are the same width as the square waves from the clipper-amplifier 224. The switch stage 227, like stage 221, has its screen grid voltage applied through the high pulse rate lead 63. The multivibrator 226 feeds its lower frequency to a switch stage 228 whose screen grid voltage is applied through the low pulse rate lead 62. The switch stages 227 and 228 have a common output supplying a differentiating amplifier 229. The amplifier 229 sharpens the impressed pulses and supplies the synchronizing input of an asymmetrical multivibrator 231. The first and second stages of the multivibrator have long and short time constants, respectively. The periodicity of rectangular shaped output waves from the multivibrator 231 is determined by the synchronizing pulses coming from either the switch stage 227 or 228 while the width of the positive portions of the multivibrator waves is adjusted to cover most of the period during the high pulse rate operation. The resulting wave shown in graph E of Fig. 10 is supplied to the navigational intensifier lead 83. The solid line represents the wave generated during low pulse rate operation and the dotted line represents the additional waves added in accordance with the high pulse rate.

The clipper-amplifier 225 of Fig. 21 feeds square waves of the frequency of the multivibrator 202 to a differentiating amplifier 232. A positive pulse from the front edge of the impressed square wave is supplied to a sweep circuit 238 similar to circuit 219. The time sweep lead 81 is connected to the output of circuit 238 and feeds the wave shown in graph D of Fig. 10 to the navigational indicator 43.

An amplifier 233 amplifies the same positive pulse supplied to the sweep circuit 238 and supplies it to the blanking pulse lead 35 in the form shown in graph C of Fig. 10. This same pulse is passed from amplifier 233 through a switch stage 234. An amplifier 235 takes the square waves from the common output of switch stages 227 and 228 and after sufficient amplification applies them to the screen grid of the switch stage 234. Thus stage 234 is operative in the sequence D of Fig. 9 and feeds a differentiating amplifier 236 which further sharpens the pulse. An output amplifier 237 connected to stage 236 furnishes the lead 4 with the trigger pulses shown in graph B of Fig. 10. It is observed that the trigger pulse is derived from the blanking pulse and therefore may be adjusted in phase to fall within the duration of the latter. The navigational time sweep is seen to commence immediately upon the termination of the blanking pulse.

Referring now to Fig. 22, there is shown details of the navigational and vernier indicators 43 and 50, respectively. The two circuits may have much structural similarity so that parts in the vernier indicator not requiring separate discussion and corresponding to parts in the navigational indicator are given corresponding primed reference numbers. It is to be understood that only one oscilloscope need be employed if desired, switching being provided to place either the navigational or vernier pattern on the same indicator screen. Separate structures 43 and 50 are shown for illustrative purposes and not as a limitation.

In the navigational indicator 43 a cathode ray oscilloscope 251 has vertical and horizontal deflection plates 252 and 253, respectively, and is energized by a power supply 254. The first anode 255 is connected through a load resistance 256 to the tap on a potentiometer 257 one end of which is attached to a positive potential source in the power supply 254 while the other end goes to ground through resistance 258 and potentiometer 259. The intensifier pulse lead 83 from the synchronizer 1 is coupled to anode 255 by a condenser 272. The control grid 261 is connected through the load resistance 262 to the tap on the potentiometer 259. A lead 273 connects the output of mixer 266 through the coupling condenser 274 to the grid 261. The mixer 266, comprising two amplifiers feeding a common load, has one input connected to the slant range reference pulse lead 85 while the other input is attached to the receiver summation output lead 42. The azimuth reference lead 66 is connected to the junction of resistances 264 and 265. The azimuth sweep lead 69 is attached to an amplifier 268 whose output is not only connected to the horizontal plates 253 but also to the vernier indicator 50 over the lead 87. The navigational time sweep lead 81 is attached to the vertical plates 252.

In the vernier indicator 50 the cathode ray oscilloscope 251' may be of smaller size than tube 251. The intensifier pulse lead 84 from the synchronizer 1 is coupled to the anode 255'. A mixer 267 similar to the mixer 266 has one input connected to the slant range reference pulse lead 86 while the other input is joined to the signal comparator output lead 49. The azimuth reference lead 67 is connected to the junction of resistances 264' and 265'. The lead 87 from the navigational indicator feeds the input of a limiter 269. The limiter 269 works into an amplifier 271 which latter connects to the horizontal plates 253' of the oscilloscope 251'. The vernier time sweep lead 82 is attached to the vertical plates 252'.

In the operation of the navigational indicator 43 of Fig. 22, the first anode 255 is normally positive and the control grid 261 negative with respect to the cathode 263. While the transmitter switch is in the "on" position of sequence A of Fig. 9, and when the receiver 32 of Fig. 4 is not made inoperative by the blanking pulse of graph C of Fig. 10, received pulses may pass to the mixer 266. These pulses have a magnitude and shape dependent upon the distance, reflection characteristics, and effective size of the object. The beam of the oscilloscope is made ready to be turned on by the intensifier pulses of graph E of Fig. 10 as applied to the first anode over the lead 83. The solid line wave forms are produced during the periods of low pulsing rate while the forms drawn with dashed lines are added during the high pulsing rate periods. The time sweep of graph D of Fig. 10, impressed on the vertical plates 252 by the lead 81, deflects the beam vertically at a substantially linear rate, starting almost immediately after the emission of a transmitter pulse. Thus the received signals as they modulate the intensity of the beam appear in a vertical position proportional to the time delay between transmission and reception; consequently this position is a measure of the distance to the point of reflection. The intensifier pulse is spaced so that the beam appears only during the upward sweep of the timing voltage, return traces being suppressed. The horizontal sweep, supplied by the sweep generator 71 and modified by the azimuth correction circuit 74 as explained with reference to Fig. 18, may have the wave shape illustrated in graph F of Fig. 9. This voltage deflects the cathode beam across the tube screen simultaneously with the time sweep but at the much lower scanning frequency.

Since the receptivity of the signals is highly directive, the signals will be spread horizontally according to their direction of reception. On every vertical sweep the time delay corresponding to the position of the slant range reference pulse will be marked by an intensification of the beam. These reference spots form a continuous horizontal trace 107, shown in Fig. 6, as the azimuth sweep deflects the beam across the tube. Since the heading of the sighting line is determined by the position of the scanner when the azimuth sweep voltage is zero, the azimuth sweep may be conveniently shorted to obtain a stabilized sighting line reference. Lead 69 is shorted by the commutator 61, shown in Fig. 4, through the lead 68 of that figure in the cycle corresponding to the "off" positions of sequence I of Fig. 9. Now this period is during the absence of intensifier pulses so that the beam must be made visible by another means. This is accomplished by grounding lead 66 in the commutator 61 and thereby decreasing the negative bias on the control grid 261 sufficiently to turn on the electron beam. The time sweep operates continuously irrespective of intensifier operation and therefore draws a vertical line 108, shown in Fig. 6, corresponding to the heading of the stabilized sighting line.

The operation of the vernier indicator 50 is somewhat similar to that of the navigational indicator 43 although the operating wave shapes are different. Signals are received by the mixer 267 from the sharply directive output of the signal comparator 48 and placed on the control grid 261' only during the interval of the gating pulse, previously discussed. The vernier indicator beam is turned on simultaneously with the gating pulse by intensifier pulses shown in graph G of Fig. 10, coming from the synchronizer 1 over the lead 84. The intensifier pulse is seen to be a fraction of the duration of the navigational intensifier pulse and may be varied in time as described in Fig. 21, anywhere within the limits of the latter pulse. A time sweep, shown in graph F of Fig. 10, sweeps the beam vertically at a substantially linear rate, spreading the signals received during the vernier intensifier pulse over the entire height of the face of the tube 251'. The vernier intensifier pulse is produced only during the high pulsing rate of the transmitter as seen in sequence E, Fig. 9. The horizontal sweep is supplied from the navigational azimuth sweep over the lead 87. The sweep voltage is amplified and limited by devices 271 and 269, respectively, until it assumes substantially the wave form shown in graph G of Fig. 9. It is observed that the vernier azimuth sweep covers just the angle over which the high pulsing rate is radiated by the scanner. The slant range and azimuth reference traces 107' and 108', shown in Fig. 7, are obtained in a similar manner as the corresponding traces of indicator 43.

The advantages of the electronic reference traces seem readily apparent. Changes in the operating characteristics of the oscilloscopes and in the associated sweep circuits may alter the position of the received signals on the tube screens, but the reference traces are shifted a like amount and thus the accuracy is unimpaired. The simplicity of this method contrasts with cumbersome mechanical pointers and fixed scale markings on oscilloscope screens which require constant recalibration.

It is to be understood that the apparatus of the present invention is not in any way confined to overcast bombardment. Even when this equipment is installed on a bomber there are many other uses to which it may be put. During the flight to and from an objective valuable piloting information may be obtained. The drift angle $\alpha$ is immediately determinable by aligning the heading of the scanner assembly so that the pattern on the indicator face moves parallel to the azimuth reference trace. The cross trail correction would of course be set to zero.

The ground speed of the aircraft is readily found in conjunction with the range displacement and rate controls of the computer mechanism by following the pattern with the slant range reference trace as it moves down the indicator screen and then reading the rate indicated by the computer. The absolute altitude above the surrounding terrain is available by setting the sighting angle to zero so that the scanner points straight down. Under these conditions the slant range as measured by the reference trace equals the altitude.

By the use of the navigational indicator landmarks may be recognized along the route. Especially clearly revealed are coast lines, river courses, and lake outlines.

After the attack has been effected, the device may be employed to detect enemy pursuit craft and aid in directing defensive fire from the bomber. On returning from a mission the present invention may be utilized to facilitate instrument landing. The home airport may have low power transmitters situated to outline the runway or otherwise define a landing path and designed to operate only when actuated by the energy of the scanning beam. The transmitters may emit suitable pulses of substantailly the same frequency as that of the scanning pulses so that slant range as well as azimuth angle may be ascertained.

It seems unnecessary to point out that the invention may be used in a simplified form for many other applications. For example, the cross trail correction circuits and the computer mechanism may be dispensed with when the equipment of the present invention is used on torpedo boats or reconnaissance aircraft.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A radio echo detection system, comprising means for producing a concentrated electromagnetic beam emission of discrete pulses, means for scanning said beam emission in a field in space in a predetermined manner, a first cathode ray tube, means for producing a sweep of the electron beam thereof in accordance with the scanning movement of said beam emission, means receiving energy reflected back from objects upon which said beam emission impinges, means for applying said received energy to said cathode ray tube to produce an indication of the reception thereof, a second cathode ray tube, and means responsive to said scanning means for producing on said second cathode ray tube an enlarged replica of any given sweep area on said first cathode ray tube.

2. A radio object detecting system for movable craft, comprising means for irradiating an object with radio frequency energy, means for receiving energy reflected from said object, a cathode ray tube mountable on said craft, said tube having a screen and electron beam deflecting means, said tube being responsive to signals derived from said received reflected energy for forming a luminous image of said object on said screen positioned in accordance with the bearing of said object from said craft, gyro control means responsive to deviations of said craft from a normal attitude, and means actuated by said control means for generating a corrective signal as a function of said deviations and for applying said corrective signal to said deflection means to minimize relative motion between said image and said screen resulting from said deviations.

3. In an object locating system, generator means for generating electromagnetic energy in pulses at one of a plurality of rates, radiator means for emitting said pulses in a directive beam, motive means for turning said radiator to scan a field of view, and switching means actuated by said motive means for controlling said generator means to select desired pulse rates for emission over desired sectors of the field of view.

4. In a radio object detecting and locating system wherein ultra high frequency electromagnetic waves are directionally radiated to scan a field of view and a cathode ray indicator is actuated by such waves as are received from reflecting objects for revealing the positional data thereof, the provision of scanning means comprising a plurality of directive radiators mounted around a common axis of rotation, and dual wave translating means coacting with each of said radiators for creating partially overlapping radiation patterns which define equi-intensity lines diverging from said axis of rotation, and means for rotating said scanning means causing said equi-intensity lines to sweep said field of view a plurality of times during each rotation of said scanning means.

5. In a radio apparatus for object locating, means for comparing the direction of an object to a reference direction comprising, a generator of ultra high frequency energy pulses, means for radiating the pulses in a directive electromagnetic beam, means for periodically scanning a field of view including the object with a beam, means for generating a directional sweep voltage dependent upon the instantaneous direction of the beam, the voltage being predetermined in the reference direction, means for receiving energy reflected from the object, indicator means for representing the reflected energy by a luminous image, means actuated by the directional sweep voltage for positioning the image according to the direction of the beam when the object is scanned, means for producing a substantially linear time sweep having a frequency equal to a harmonic, including the first, of the rate of generation of the ultra high frequency pulses, means actuated by the time sweep voltage for positioning the image according to the time delay between the radiation of a pulse and the reception of energy from the object due to the pulse, means for creating within the periods of no scanning a reference voltage having a value equal to that of said predetermined directional sweep voltage, said reference voltage being applied to said indicator means, and means for producing a luminous spot within this period, said spot being swept into a directional reference line by the time sweep voltage.

6. In an object locating system, means for generating trigger pulses at a plurality of rates, a generator of ultra high frequency energy, means inter-connecting said trigger pulse generating means and said generator of ultra high frequency energy for modulating the latter with the trigger pulses to produce said energy in pulses, radiator means connected to said generator of ultra high frequency energy for emitting energy derived therefrom in a directive beam, means for turning said radiator so that the beam scans a field of view and commutating means actuated synchronously therewith, switching means connected to said trigger pulse generating means and controlled by said commutating means for selecting desired pulse rates for emission over desired sectors of the field of view.

7. An electromagnetic scanner comprising, a plurality of directive reflectors arranged about an axis of rotation, motor means for rotating said reflectors at a desired angular velocity, cylindrical wave guide means concentric with the axis of rotation, rectangular wave guides having open ends substantially at the foci and facing said reflectors and having opposite ends abutting said cylindrical wave guide means substantially at right angles thereto, and valve means actuated by said motor means for connecting the abutting ends of said rectangular wave guides to said cylindrical wave guide means in succession.

8. In apparatus of the character described means for producing ultra high frequency electromagnetic energy, means for directionally radiating said electromagnetic energy into space while scanning a field of view, said radiating means comprising, open-end wave guide radiators and cooperating reflectors, antenna means for directionally receiving said energy upon reflection from remote objects, said antenna means comprising wave guide receivers having open ends placed on either side of the open ends of said wave guide radiators and cooperating with said reflectors to produce partially overlapping receptive spatial patterns, means for supporting said wave guides and reflectors about an axis of rotation, means responsive to the energy in the receptive spatial patterns, motive means for turning said wave guides and reflectors about the axis of rotation at a desired angular velocity and switch means concentric with said supporting means and actuated by said motive means for connecting said wave guide radiators to said energy producing means and said wave guide receivers to said energy responsive means over a desired scanning angle.

References Cited in the file of this patent

UNITED STATES PATENTS

| | | |
|---|---|---|
| 833,034 | De Forest | Oct. 9, 1906 |
| 1,849,611 | Bussei | Mar. 15, 1932 |
| 1,938,742 | Demarest | Dec. 12, 1933 |
| 1,940,518 | Watson et al. | Dec. 19, 1933 |
| 2,061,734 | Kell | Nov. 24, 1936 |
| 2,133,241 | Baker | Oct. 11, 1938 |
| 2,143,035 | Smith | Jan. 10, 1939 |
| 2,151,549 | Becker | Mar. 21, 1939 |
| 2,176,469 | Moueix | Oct. 17, 1939 |
| 2,177,061 | Gerhard | Oct. 24, 1939 |
| 2,189,549 | Hershberger | Feb. 6, 1940 |
| 2,205,560 | Herzog | June 25, 1940 |
| 2,216,707 | George | Oct. 1, 1940 |
| 2,226,459 | Bingley | Dec. 24, 1940 |
| 2,231,929 | Lyman | Feb. 18, 1941 |
| 2,257,320 | Williams | Sept. 30, 1941 |
| 2,288,102 | Meredith | June 30, 1942 |
| 2,779,939 | Page | Jan. 29, 1957 |
| 2,855,592 | Busignies | Oct. 7, 1958 |